United States Patent
Cao et al.

(10) Patent No.: US 11,102,717 B2
(45) Date of Patent: Aug. 24, 2021

(54) NETWORK SELECTION METHOD AND APPARATUS FOR INTEGRATED CELLULAR AND DRONE-CELL NETWORKS

(71) Applicant: BEIHANG UNIVERSITY, Beijing (CN)

(72) Inventors: Xianbin Cao, Beijing (CN); Wenbo Du, Beijing (CN); Xing Xi, Beijing (CN); Peng Yang, Beijing (CN); Zhenyu Xiao, Beijing (CN); Dapeng Wu, Beijing (CN)

(73) Assignee: BEIHANG UNIVERSITY, Beijing (CN)

(*) Notice: Subject to any disclaimer, the term of this patent is extended or adjusted under 35 U.S.C. 154(b) by 31 days.

(21) Appl. No.: 16/675,060

(22) Filed: Nov. 5, 2019

(65) Prior Publication Data
US 2020/0154349 A1    May 14, 2020

(30) Foreign Application Priority Data

Nov. 14, 2018    (CN) .......................... 201811353219.4

(51) Int. Cl.
*H04W 48/18*    (2009.01)
*B64C 39/02*    (2006.01)
(Continued)

(52) U.S. Cl.
CPC ........... *H04W 48/18* (2013.01); *B64C 39/024* (2013.01); *H04B 7/18504* (2013.01);
(Continued)

(58) Field of Classification Search
CPC ... H04W 48/18; H04W 4/021; H04W 88/085; B64C 39/024; B64C 2201/122; H04B 7/18504; H04B 84/06
(Continued)

(56) References Cited

U.S. PATENT DOCUMENTS 9,866,313 B1 * 1/2018 Murphy ................ H04W 16/26
2017/0111228 A1 * 4/2017 Obaidi .................... B60L 53/12
(Continued)

FOREIGN PATENT DOCUMENTS

CN    103332290 A    10/2013
CN    106054928 A    10/2016
(Continued)

OTHER PUBLICATIONS

Huang, Hailong, "An Algorithm of Efficient Proactive Placement of Autonomous Drones for Maximum Coverage in Cellular Networks" IEEE Wireless Communications Letters; vol. 7, Issue 6; (Jun. 2018); pp. 994-997.
(Continued)

*Primary Examiner* — Danh C Le

(74) *Attorney, Agent, or Firm* — J.C. Patents

(57) ABSTRACT

Provided are a network selection method and an apparatus for integrated cellular and drone-cell networks, where the method includes: acquiring a dynamic network model and a dynamic user model, generating a random event vector according to the dynamic network model and the dynamic user model; generating an action vector according to the random event vector; obtaining an individual utility of each user according to the action vector and the random event vector; constructing a first selection model; obtaining the value of the action probability according the first selection model to determine networks that the users choose to access according to the value of the action probability.

9 Claims, 12 Drawing Sheets

(51) Int. Cl.
 *H04B 7/185* (2006.01)
 *H04W 4/021* (2018.01)
 *H04W 84/06* (2009.01)
 *H04W 88/08* (2009.01)

(52) U.S. Cl.
 CPC ......... *H04W 4/021* (2013.01); *H04W 84/06* (2013.01); *H04W 88/085* (2013.01); *B64C 2201/122* (2013.01)

(58) Field of Classification Search
 USPC .............................. 370/338, 310.2; 455/12.1
 See application file for complete search history.

(56) References Cited

U.S. PATENT DOCUMENTS

| | | | |
|---|---|---|---|
| 2018/0007518 A1 | 1/2018 | O'Berry et al. | |
| 2018/0102831 A1* | 4/2018 | Murphy | H04W 64/00 |
| 2018/0276995 A1* | 9/2018 | Priest | G08G 5/0039 |
| 2019/0035287 A1* | 1/2019 | Priest | G08G 5/0091 |
| 2019/0295427 A1* | 9/2019 | Priest | H04W 4/44 |
| 2019/0327712 A1* | 10/2019 | Moradi | H04B 1/7097 |
| 2020/0202284 A1* | 6/2020 | Singh | G06Q 10/083 |
| 2020/0223543 A1* | 7/2020 | Singh | H04B 7/18506 |
| 2020/0260404 A1* | 8/2020 | Vrind | H04B 7/18504 |
| 2020/0314628 A1* | 10/2020 | Panchal | H04W 8/24 |
| 2020/0355571 A1* | 11/2020 | Priest | G08G 5/0013 |
| 2021/0044613 A1* | 2/2021 | Sugarbaker | H04L 43/08 |

FOREIGN PATENT DOCUMENTS

| | | |
|---|---|---|
| CN | 106604205 A | 4/2017 |
| CN | 107517158 A | 12/2017 |

OTHER PUBLICATIONS

Xu, Min et al., "Research of UAV Communications Based on Mobile Cellular Networks" Chinese Journal of Mobile Communication; No. 22; (Dec. 2017); pp. 23-28, English Abstract is included.
The Chinese First Examination Report of correspondence Chinese application No. 201811353219.4, dated Dec. 4, 2019.
Notice of Allowance of prior Chinese application No. 201811353219.4.

* cited by examiner

NETWORK SELECTION METHOD AND APPARATUS FOR INTEGRATED CELLULAR AND DRONE-CELL NETWORKS

CROSS-REFERENCE TO RELATED APPLICATION

This application claims priority to Chinese Patent Application No. 201811353219.4, filed on Nov. 14, 2018, which is hereby incorporated by reference in its entirety.

TECHNICAL FIELD

The present disclosure relates to the field of a network selection, and in particular to a network selection method and an apparatus for integrated cellular and drone-cell networks.

BACKGROUND

In order to provide better network dada service and alleviate the congestion of cellular network, a solution of resorting to drone-cells (i.e., low-altitude drones equipped with transceivers) to offload traffic from the congested cellular network can be adopted. To make full use of resources of drone-cells, a significant challenge is how to make an efficient and fair network selection for integrated cellular and drone-cell networks.

An approach for solving a network selection problem is a game-theory-based approach. In the game-theory-based approach, the network selection problem is firstly modeled as a game and then a centralized/distributed approach is exploited to achieve an equilibrium. For example, Cheung et al. formulated the network selection problem as a Bayesian game under the condition that mobility information of users is not complete. Then, they proposed a distributed approach with good convergence properties to achieve the Bayesian Nash equilibrium.

The existing game-theory-based approaches consider the interaction and competition among users. Most of the approaches, however, studied the network selection problem under the situation with quasi-static or predictable network states. However, the integrated cellular and drone-cell networks are highly dynamic, and the network state is hard to predict. Therefore, it is difficult for the existing game-theory-based approaches to solve the network selection problem of the integrated cellular and drone-cell networks.

SUMMARY

The present disclosure provides a network selection method and an apparatus for integrated cellular and drone-cell networks, aiming at solving the problem that the existing game-theory-based approaches cannot solve the network selection problem for the integrated cellular and drone-cell networks because the integrated cellular and drone-cell networks are highly dynamic, and the network state is hard to predict.

In a first aspect, the present disclosure provides a network selection method for integrated cellular and drone-cell networks, including:

acquiring a dynamic network model and a dynamic user model, where the dynamic network model includes at least a location model of the drone-cell networks, a capacity model of the cellular network and a capacity model of the drone-cell networks, and the dynamic user model includes at least a location model and a transmission rate model of users;

generating accessible network sets of the users according to the location model of the drone-cell networks and the location model of the users;

generating a random event vector according to the capacity model of the cellular network, the capacity model of the drone-cell networks, the accessible network sets of the users and the transmission rate model, where the accessible network sets of the users include the drone-cell networks and/or the cellular network:

generating an action vector according to the random event vector where the action vector is used for indicating that the users choose to access to the drone-cell networks and/or the cellular network:

obtaining an individual utility of each user according to the action vector and the random event vector;

constructing a first selection model, where the first selection model includes a first objective function and a first constraint, where the first objective function is a proportional fairness function with time average of individual utilities of the users as independent variables, and the first constraint includes at least a first coarse correlated equilibrium constraint, a first minimum individual time average utility constraint and a first action probability constraint, where the first coarse correlated equilibrium constraint is used for constraining the time average of the individual utilities and first auxiliary variables, the first minimum individual time average utility constraint is used for constraining the time average of the individual utilities, and the first action probability constraint is used for constraining the action probability under the condition of the random event vector;

obtaining the time average of the individual utilities according to the individual utilities, the random event probability and the action probability under the condition of the random event vector, where the action probability under the condition of the random event vector is the probability that the users execute the action vector under the condition that the random event vector occurs, and the random event probability is the probability that the random event occurs; and obtaining a value of the action probability according the first selection model, and determining networks that the users choose to access according to the value of the action probability.

The network selection method provided by the present disclosure includes acquiring the dynamic network model and the dynamic user model, generating the random event vector according to the dynamic network model and the dynamic user model, constructing the first selection model according to the random event vector and the action vector, obtaining the value of the action probability according to the first selection model, and determining the networks that the users choose to access according to the value of the action probability. It solves the problem that the existing game-theory-based approaches cannot solve the network selection problem for the integrated cellular and drone-cell networks because the integrated cellular and drone-cell networks are highly dynamic, and the network state is hard to predict.

In a second aspect, the present disclosure provides a network selection apparatus for integrated cellular and drone-cell networks, including:

a transceiver, configured to collect capacity information of the drone-cell networks, capacity information of the cellular network, set information of accessible networks of the users, data transmission rate information, and transmitting action vector information to the users so that the users can determine the networks to access according to the action vector information;

a processor, configured to generate the action vector information according to the capacity information of the drone-cell networks, the capacity information of the cellular network, the set information of the accessible networks of the users, the data transmission rate information and a fourth selection model.

The fourth selection model is that a difference value between drift of total violation and an utility is less than or equal to a penalty upper bound, where the drift of the total violation is obtained according to a value of the total violation at a current time slot and a value of the total violation at a next time slot;

the value of the total violation at the current time slot is obtained according to a first virtual value at the current time slot, a second virtual value at the current time slot and a third virtual value at the current time slot;

the first virtual value in the first virtual queue at the current time slot is generated according to violation of second coarse correlated equilibrium constraints at a previous time slot and the first virtual value in the first virtual queue at the previous time slot;

the second virtual value in the second virtual queue at the current time slot is generated according to violation of third auxiliary variable constraints at the previous time slot and the second virtual value in the second virtual queue at the previous time slot;

the third virtual value in the third virtual queue at the current time slot is generated according to violation of a second minimum individual time average utility constraint at the previous time slot and the third virtual value in the third virtual queue at the previous time slot, where the first virtual value at an initial time slot, the second virtual value at the initial time slot, and the third virtual value at the initial time slot are all zero;

a third selection model includes a third objective function and a third constraint, where the third objective function is time average expectation of a proportional fair function with third auxiliary variables as independent variables, and the third constraint includes at least the second coarse correlated equilibrium constraints, the second minimum individual time average utility constraint, a second auxiliary variable constraint, and the third auxiliary variable constraints, where the second coarse correlated equilibrium constraints are used for constraining time average expectation of the individual utilities and time average expectation of the second auxiliary variables, the second minimum individual time average utility constraint is used for constraining the time average expectation of the individual utilities, the second auxiliary variable constraint is used for constraining the second auxiliary variables, and the third auxiliary variable constraints are used for constraining the time average expectation of the third auxiliary variables and the average time expectation of the individual utilities;

the first selection model includes a first objective function and a first constraint, where the first objective function is a proportional fairness function with time average of the individual utilities as independent variables, and the first constraint includes at least a first coarse correlated equilibrium constraint, a first minimum individual time average utility constraint and a first action probability constraint, where the first coarse correlated equilibrium constraint is used for constraining the time average of the individual utilities and first auxiliary variables, the first minimum individual time average utility constraint is used for constraining the time average of the individual utilities, and the first action probability constraint is used for constraining the action probability under the condition of an random event vector;

the time average of the individual utilities is obtained according to the individual utilities, a random event probability and the action probability under the condition of the random event vector, where the action probability under the condition of the random event vector is the probability that the users execute the action vector under the condition that the random event vector occurs;

an individual utility of each user is obtained according to the action vector and the random event vector; and the action vector is generated according to the random event vector, and the random event vector is generated according to a capacity model of the cellular network, a capacity model of the drone-cell networks, accessible network sets of the users and a transmission rate model, where the accessible network sets of the users is generated according to a location model of the drone-cell networks and a location model of the users.

In the network selection method and the apparatus provided by the present disclosure, the network selection method includes acquiring the dynamic network model and the dynamic user model, generating the random event vector according to the acquired dynamic network model and the dynamic user model, constructing the first selection model according to the random event vector and the action vector, obtaining the value of the action probability according to the first selection model, and determining the networks that the users choose to access according to the value of the action probability.

The present disclosure constructs a dynamic network model and a dynamic user model, simulating the high dynamic of the drone-cell-user connection, the fluctuation of the network capacity and the time-varying of user traffic, etc. The present disclosure formulates the network selection problem as a problem of a repeated stochastic game, which simulates the competition and interaction among the users well. The method can maximize the total user utility while ensuring the fairness among the users. It solves the problem that the existing game-theory-based approaches cannot solve the network selection problem for the integrated cellular and drone-cell networks because the integrated cellular and drone-cell networks are highly dynamic, and the network state is hard to predict.

DETAILED IMPLEMENTATION OF THE EMBODIMENTS

In order to make purpose, technical solutions and advantages of embodiments of the present disclosure clearer, the technical solutions of the embodiments of the present disclosure will be described hereunder clearly and comprehensively with reference to accompanying drawings. Apparently, the described embodiments are only a part of embodiments of the present disclosure, rather than all of them. Based on the embodiments of the present disclosure, all other embodiments obtained by those of ordinary skilled in the art without any creative effort shall fall into the protection scope of the present disclosure.

Figure 1:
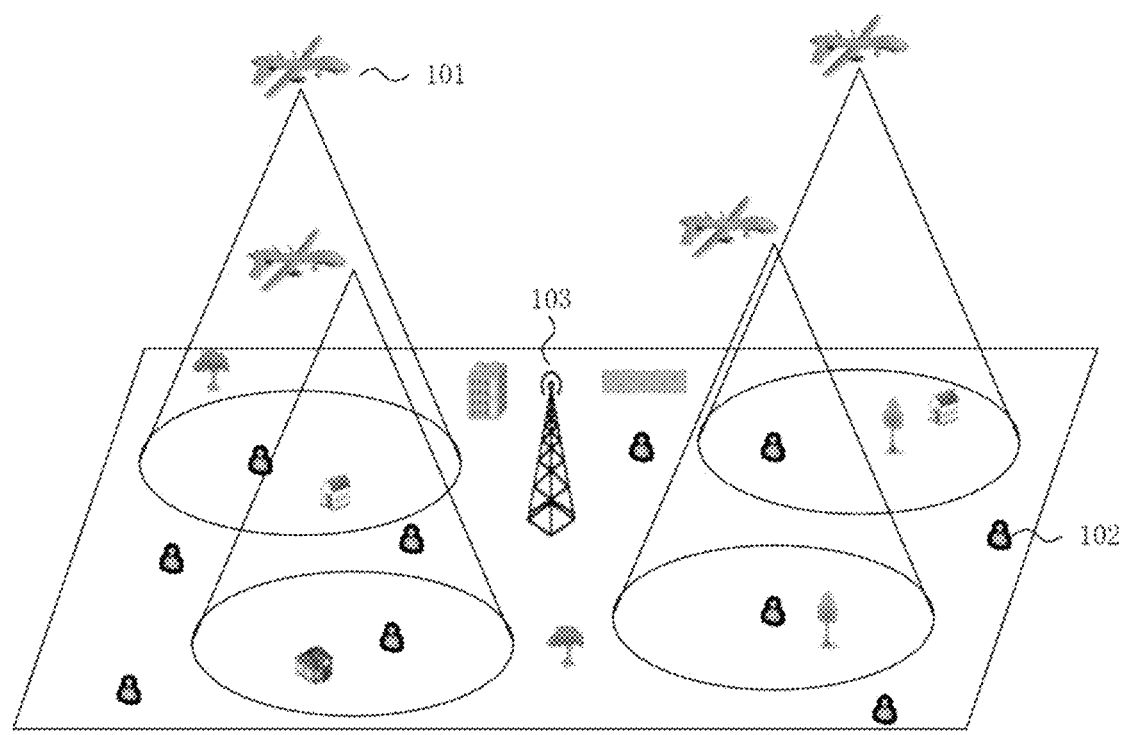
FIG. 1 is a scenario diagram of a network on which a network selection method according to the present disclosure is based.

FIG. 1 is a scenario diagram of a network on which a network selection method according to the present disclosure is based. As shown in FIG. 1, the present disclosure investigates a network selection scenario for the integrated cellular and drone-cell networks. In this scenario, a cellular network 103 is constructed to provide radio access to a collection of users $\mathcal{I}=\{1, 2, \ldots, N\}$ moving randomly and independently in a geographical area of L×W m² over an infinite sequence of time slots t={0, 1, 2, ...}. Meanwhile, a set of drone-cells are deployed to alleviate the congestion situation of the cellular network. Meanwhile, the present disclosure assumes that every drone-cell connects directly to a ground station moves independently and is deployed at the same and fixed altitude h. Let $\mathcal{J}=\{0, 1, 2, \ldots, M\}$ be a network set, where j=1 denotes the cellular network, $j \in \mathcal{J}_d=\{2, \ldots, M\}$ denotes the j-th drone-cell network, and j=0 represents an empty network indicating that a user does not access to any network. At each time slot t, a user can select a network to access from the accessible network set. Meanwhile, the present disclosure does not consider the switching cost when a user changes its network access state.

Figure 2:
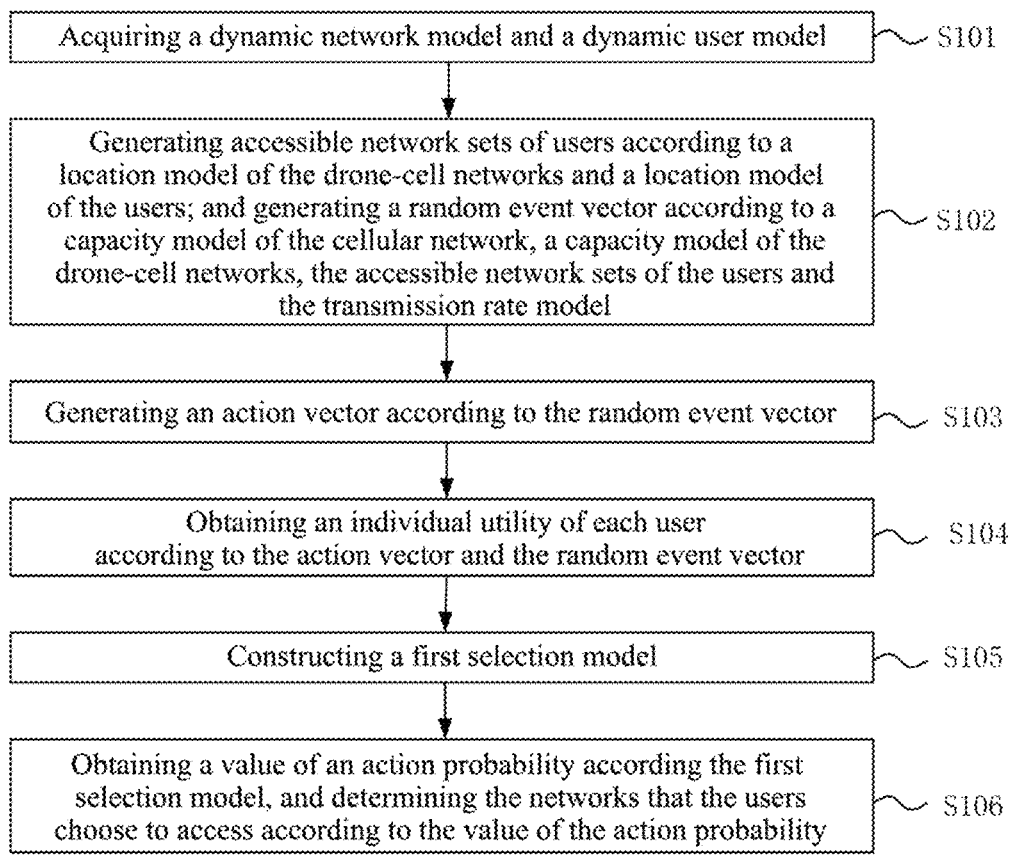
FIG. 2 is a flowchart illustrating a network selection method according to an exemplary embodiment of the present disclosure.

FIG. 2 is a flowchart illustrating a network selection method according to an exemplary embodiment of the present disclosure. As shown in FIG. 2, the network selection method according to the present disclosure includes:

S101: acquiring a dynamic network model and a dynamic user model.

More specifically, the dynamic network model includes at least a location model of drone-cell networks, a capacity model of a cellular network and a capacity model of the drone-cell networks, and the dynamic user model includes at least a location model and a transmission rate model of users;

For the network coverage characteristic, this embodiment assumes that the cellular network can cover the whole considered area and a drone-cell can only cover a small region. Specifically, every drone-cell is assumed to have the same and limited coverage radius (denoted by $R_d$). Let $r_{ij}$ denotes a horizontal distance between the i-th user and the j-th drone-cell. The i-th user can access to the j-th drone-cell, if $r_{ij} \leq R_d$; otherwise, it cannot.

For the location model of the drone-cell networks, this embodiment introduces a smooth turn mobility model with reflection boundary. In this model, each drone will fly with a smooth and random trajectory without sharp turning. Specifically, a drone is assumed to have a constant forward speed $V_d$ (in m/s) and can change its centripetal acceleration randomly. The duration (in seconds) for the drone to maintain its current centripetal acceleration is subject to an exponential distribution with mean $1/\lambda_d$. Meanwhile, the reciprocal of the turning radius (in m) of the drone-cell is subject to a Gaussian distribution with zero-mean and variance $\sigma_d^2$.

For the capacity model of the networks, this embodiment assumes that the network capacity, denoted by $C_1(t)$, of the cellular network at time slot t is subject to a truncated Gaussian distribution $N(\mu_b, \sigma_b^2)$ within the interval $C_1(t) \in [\mu_b - 2\sigma_b, \mu_b + 2\sigma_b]$, where $2\sigma_b < \mu_b$. Meanwhile, this embodiment assumes that for each drone-cell network $j \in \mathcal{J}$, its capacity at slot t, denoted by $C_j(t)$, is independent and identically distributed (i.i.d.) and is subject to a truncated Gaussian distribution $N(\mu_c, \sigma_c^2)$ within the interval $C_j(t) \in [\mu_c - 2\sigma_c, \mu_c + 2\sigma_c]$, where $2\sigma_c < \mu_c$.

For the location model of the users, this embodiment develops a boundary Gauss-Markov mobility model based on the Gauss-Markov mobility model. Specifically, based on the Gauss-Markov mobility model, this embodiment considers a user that moves within a rectangular area $$\left[-\frac{L}{2}, \frac{L}{2}\right] \times \left[-\frac{W}{2}, \frac{W}{2}\right]$$

and reflects on the boundary. Thus, the location (denoted by $l_u(t)=(x_u(t), y_u(t))$) and the velocity (denoted by $v_u(t)=((v_u^x(t), v_u^y(t)))$ of a user in the boundary Gauss-Markov mobility model can meet the following updated formulas:

$$l_u(t+1) = (-1)^k \odot (l_u(t) + v_u(t) - k \odot (L, W)) \quad (1)$$

$$v_u(t+1) = (-1)^k \odot \alpha_u \odot v_u(t) + \sqrt{1+\alpha_u^2} \odot \sigma_u \odot w_u(t) \quad (2)$$

where $$k = (k_x, k_y) = \left( \left\lfloor \left( x_u(t) + v_u^x(t) + \frac{L}{2} \right) / L \right\rfloor, \left\lfloor \left( y_u(t) + v_u^y(t) + \frac{W}{2} \right) / W \right\rfloor \right), \odot$$

denotes the Hadamard product, $\lfloor \cdot \rfloor$ denotes the floor operation, $\alpha_u = (\alpha_{ux}, \alpha_{uy})$ is a two-dimensional (2-D) memory level vector, $\sigma_u = (\sigma_{ux}, \sigma_{uy})$ is a 2-D asymptotic standard deviation vector of the velocity, the 2-D memory level vector and the 2-D asymptotic standard deviation vector of the velocity are constants, $w_u(t) = (w_u^x(t), w_u^y(t))$ represents a 2-D uncorrelated Gaussian process, and $w_u^x(t)$ and $w_u^y(t)$ are independent and are both zero-mean and unit-variance.

For the transmission rate model of the users, this embodiment assumes that for each user $i \in \mathcal{I}$, the required data transmission rate at time slot t (denoted by $R_i(t)$) is i.i.d. and is subject to a truncated Gaussian distribution $N(\mu_R(t), \sigma_R(t)^2)$ within the interval $R_i(t) \in [\mu_R(t) - 2\sigma_R(t), \mu_R(t) + 2\sigma_R(t)]$, where $\sigma_R(t) = \rho_R \mu_R(t)$ with $\rho_R < \frac{1}{2}$. Furthermore, $\mu_R(t)$ is a Markov process that taking a value in a finite set $\{\mu_1, \mu_2, \ldots, \mu_{K_\mu}\}$, and its one-step transfer probability matrix is defined by this embodiment as $P = [p_{i_\mu j_\mu}]_{K_\mu \times K_\mu}$, where $p_{i_\mu j_\mu}$ is the probability that the $\mu_R(t)$ will transfer from the given current value $\mu_{i_\mu}$ to the value $\mu_{j_\mu}$ at next time slot.

S102: generating accessible network sets of users according to a location model of the drone-cell networks and a location model of the users; and generating a random event vector according to a capacity model of the cellular network, a capacity model of the drone-cell networks, the accessible network sets of the users and the transmission rate model.

Figure 3:
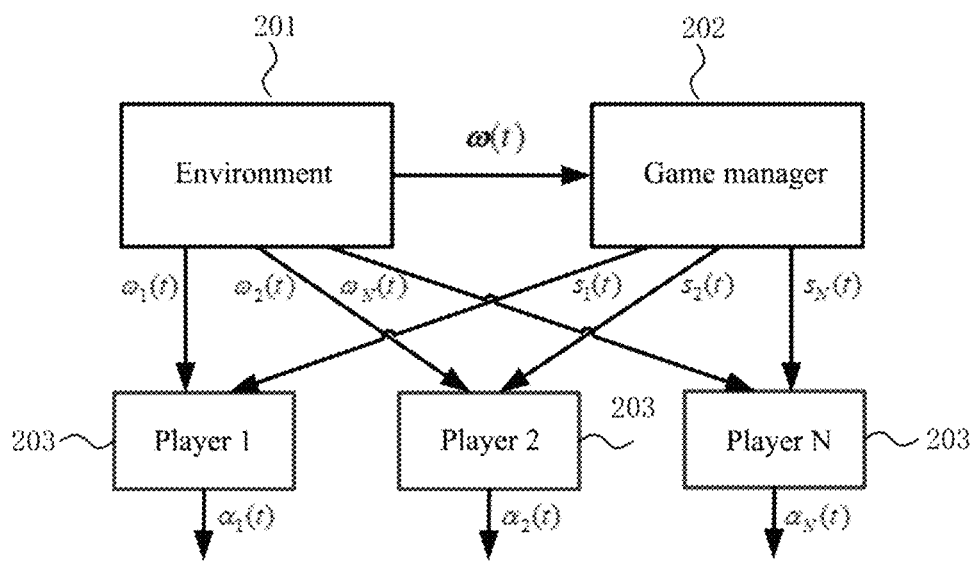
FIG. 3 is a schematic diagram of a repeated stochastic game structure obeyed by the network selection method according to the embodiment shown in FIG. 2.

More specifically, this embodiment assumes that the proposed network selection is a repeated stochastic game problem. FIG. 3 is a schematic diagram of a repeated stochastic game structure obeyed by the network selection method according to the embodiment shown in FIG. 2. As shown in FIG. 3, this structure includes an environment 201, a game manager 202 and players 203. This embodiment regards N users as players 203 and network selection strategies taken by the users as actions. At each time slot $t \in \{0, 1, 2, \ldots\}$, each player 203-$i \in \mathcal{I}$ can observe a random event $\omega_i(t) \in \Omega_i$ from the environment 201 and the game manager 202 can observe the whole random event vector $\omega(t) = (\omega_0(t), \omega_1(t), \ldots, \omega_N(t)) \in \Omega$ from the environment 201, where $\omega_0(t) \in \Omega_0$ represents the random event known only by the game manager 202 and $\Omega = \Omega_0 \times \Omega_1 \times \ldots \times \Omega_N$. Specifically, in this embodiment, the random event $\omega_0(t)$ known only by the game manager 202 includes the capacity of the cellular network and the capacity of the drone-cell networks, i.e., $\omega_0(t) = (C_1(t), C_2(t), \ldots, C_M(t))$. For all $i \in \mathcal{I}$, set $\omega_i(t) = \{\mathcal{N}_i(t), R_i(t)\}$, where $\mathcal{N}_i(t)$ represents the set of accessible non-empty networks of the player 203-$i$, i.e., $\mathcal{N}_i(t) = \{j \in \mathcal{J} \mid r_{ij}(t) \leq R_d\} \cup \{1\}$.

S103: generating an action vector according to the random event vector.

More specifically, the action vector is used for indicating that the users choose to access to the drone-cell networks and/or the cellular network. After observing the random event vector $\omega(t)$ at time slot t, the game manager 202 sends a suggestion $s_i(t) \in \mathcal{A}_i(\omega_i(t))$ to each player 203-$i$, where $\mathcal{A}_i(\omega_i(t)) = \mathcal{N}_i(t) \cup \{0\}$ is the finite set of actions available to the player 203-$i$. For example, $s_i(t) = j$ indicates that the game manager 202 suggests the player 203-$i$ choose the network j. Besides, for convenience of description, this embodiment simplifies $\mathcal{A}_i(\omega_i(t))$ as $\mathcal{A}_i(t)$.

For each player 203-$i \in \mathcal{I}$, it will choose an action $\alpha_i(t) \in \mathcal{A}_i(t)$ based on the suggestion $s_i(t)$. For example, $\alpha_i(t) = j$ indicates that the player 203-$i$ chooses to access to the network j. This embodiment lets $s(t) = (s_1(t), s_2(t), \ldots, s_N(t))$ and $\alpha(t) = (\alpha_1(t), \alpha_2(t), \ldots, \alpha_N(t))$ denote the suggestion vector and the action vector, respectively, and defines $\mathcal{A}(t) = \mathcal{A}_1(t) \times \ldots \times \mathcal{A}_N(t)$.

S104: obtaining an individual utility of each user according to the action vector and the random event vector.

The random event vector $\omega(t)$ and the action vector $\alpha(t)$ at time slot t determine the individual utility $u_i(t)$ of each player 203-$i$. Formally, the individual utility $u_i(t)$ can take the following formula:

$$u_i(t) = \hat{u}_i(\alpha(t), \omega(t)) \quad (3)$$

More explicitly, this embodiment utilizes the following expression to define $u_i(t)$.

Definition 1: for all $i \in \mathcal{I}$, the individual utility $u_i(t)$ can be defined as:

$$u_i(t) = \hat{u}_i(\alpha(t), \omega(t)) = \begin{cases} 0, & \alpha_i(t) = 0 \\ R_i(t) f(\eta_i(t)), & \text{otherwise} \end{cases} \quad (4)$$

where $f(x)$ is an effective transmission ratio function defined as:

$$f(x) = \begin{cases} 1, & 0 \leq x \leq x_b \\ \frac{1}{(1-x_b)^2}(1-x)^2, & x_b < x \leq 1 \\ 0, & \text{otherwise} \end{cases} \quad (5)$$

where $x_b$ is a constant representing the network busyness ratio threshold. Further, $$\eta_i(t) = \frac{\sum_{k \in \mathcal{I}} 1\{\alpha_k(t) = \alpha_i(t)\} R_k(t)}{C_{\alpha_i(t)}} \geq 0$$

with $1\{\alpha_k(t) = \alpha_i(t)\}$ denoting a 0-1 indicator function. The indicator function equals one, if $\alpha_k(t) = \alpha_i(t)$; otherwise, it equals zero. $C_{\alpha_i(t)}$ represents the capacity of the network corresponding to $\alpha_i(t)$.

This embodiment assumes that the upper bound of the required data transmission rate $R_i(t)$ for each player 203-$i$ is $u_i^{max}$. Then, according to Definition 1, $\hat{u}_i(\alpha(t), \omega(t))$ satisfies the following condition:

$$0 \leq \hat{u}_i(\alpha(t), \omega(t)) \leq u_i^{max} \quad (6)$$

S105: constructing a first selection model.

More specifically, the probability density function (denoted by $\pi[\omega]$) of the random event vector $\omega(t)$ can be defined as the following formula:

$$\pi[\omega] \triangleq Pr[\omega(t) = \omega], \forall \omega \in \Omega \quad (7)$$

where the notation "$\triangleq$" means "defined as equal to".

This embodiment further defines the action probability Pr[α|ω] as a conditional probability density function based on α∈$\mathcal{A}$ and ω∈Ω, where $\mathcal{A} = \mathcal{A}_1 \times \ldots \times \mathcal{A}_N$ and $$\mathcal{A}_i = \bigcup_{\omega_i \in \Omega_i} \mathcal{A}_i(\omega_i) = \mathcal{J}.$$

According to the probability theory, the action probability satisfies the first action probability constraint:

$$Pr[\alpha|\omega] \geq 0, \forall \alpha \in \mathcal{A}, \omega \in \Omega \quad (8)$$

$$Pr[\alpha|\omega] = 0, \forall \alpha \notin \mathcal{A}(\omega), \omega \in \Omega \quad (9)$$

$$\sum_{\alpha} Pr[\alpha|\omega] = 1, \forall \omega \in \Omega \quad (10)$$

where $\mathcal{A} = \mathcal{A}_1 \times \ldots \times \mathcal{A}_N$, and $\mathcal{A}_i(\omega_i)$ represents the finite set of actions available to the player 203-$i$ after the random event $\omega_i$ is observed.

With the definition of Pr[α|ω], this embodiment defines a variable $\bar{u}_i$ denoting the time average of the individual utility $u_i(t)$. According to the law of large numbers, if the action vector α(t) is chosen independently at each time slot t according to the same conditional probability density function Pr[α|ω], it can be guaranteed that for all i∈$\mathcal{I}$, $\bar{u}_i$, can be written as the following form with probability 1 (w.p. 1):

$$u_i = \sum_{\omega \in \Omega} \sum_{\alpha} \pi[\omega] Pr[\alpha|\omega] \hat{u}_i(\alpha, \omega) \quad (11)$$

In addition, considering that the game manager 202 has an objective of formulating the Pr[α|ω] to maximize the total user utility while ensuring the fairness among users, this embodiment designs an increasing and concave proportional fairness function $\phi(\bar{u}_1, \bar{u}_2, \ldots, \bar{u}_N)$ for the game manager 202 as the first objective function of the first selection model. Explicitly, this embodiment supposes that the proportional fairness function $\phi(\bar{u}_1, \bar{u}_2, \ldots, \bar{u}_N)$ is a sum of logarithmic functions:

$$\phi(\bar{u}_1, \bar{u}_2, \ldots, \bar{u}_N) = \sum_{i \in \mathcal{I}} \log_2(\bar{u}_i) \quad (12)$$

Each player 203-$i$, however, is interested in maximizing its own time average utility $\bar{u}_i$. Thus, players 203 may choose whether to accept the suggestions provided by the game manager 202. For each player 203-$i$, there are two types of selections as presented below.

Participate:
if a player 203-$i$ always chooses to accept the suggestion $s_i(t)$ at each time slot t∈{0, 1, 2, ..., }, it is called as participate. That is, $\alpha_i(t) = s_i(t)$ for all t∈{0, 1, 2, ... }.

Non-Participate:
if a player 203-$i$ chooses the action $\alpha_i(t)$ according to its observed random event $\omega_i(t)$ at each time slot t∈{0, 1, 2, ..., }, it is called as non-participate.

This embodiment assumes that non-participating players 203 will not receive the suggestions $s_i(t)$.

Definition 2: in order to incentivize all players 203 to participate, the Pr[α|ω] formulated by the game manager 202 needs to be a coarse correlated equilibrium (CCE), which is defined as follows:

For a stochastic game, Pr[α|ω] is a CCE if there are first auxiliary variables $\varphi_i(\upsilon_i) \in [0, u_i^{max}]$ for all i∈$\mathcal{I}$ meeting the following conditions:

$$\sum_{\omega \in \Omega} \sum_{\alpha} \pi[\omega] Pr[\alpha|\omega] \hat{u}_i(\alpha, \omega) \geq \sum_{\omega \in \Omega} \sum_{\alpha} \pi[\omega] Pr[\alpha|\omega] \varphi_i(\omega_i) \quad (13)$$

$$\sum_{\omega \in \Omega | \omega_i = \upsilon_i} \sum_{\alpha} \pi[\omega] Pr[\alpha|\omega] \varphi_i(\upsilon_i) \geq \quad (14)$$

$$\sum_{\omega \in \Omega | \omega_i = \upsilon_i} \sum_{\alpha} \pi[\omega] Pr[\alpha|\omega] \hat{u}_i((\beta_i, \alpha_{\bar{i}}), \omega)$$

$$\forall \upsilon_i \in \Omega_i, \beta_i \in \mathcal{A}_i$$

where, $\alpha_{\bar{i}} = \alpha \setminus \{\alpha_i\}$ represents all entries in the action vector α except for the $\alpha_i$, $\beta_i \in \mathcal{A}_i$ is a preset specific action of a non-participating player 203-$i$, and $\upsilon_i \in \Omega_i$ is a preset specific event of a non-participating player 203-$i$. Intuitively, $\varphi_i(\upsilon_i)$ represents the largest conditional expected utility earned by the non-participating player 203-$i$ when $\omega_i = \upsilon_i$ is observed.

According to Definition 2, the total number of the CCE constraints (13) and (14) is N+$\sum_{i \in \mathcal{I}} |\Omega_i||\mathcal{A}_i|$, which is a linear function over the size of sets $\Omega_i$ and $\mathcal{A}_i$, where |•| represents the number of elements in a set. The value of $|\Omega_i||\mathcal{A}_i|$, however, is too large in the system model of this embodiment; thus, the computation of a CCE is complex. This embodiment next describes how to reduce the value of $|\Omega_i||\mathcal{A}_i|$.

First, this embodiment simplifies the value space $\Omega_i$ of the preset event $\upsilon_i$. From the description of the network model in this embodiment, all drone-cells are homogenous. Therefore, for the preset event $\upsilon_i$, this embodiment only considers the number of the accessible drone-cell networks of a user i∈$\mathcal{I}$, rather than the difference in their indexes. Furthermore, the probability that a user i is covered by more than two drone-cell networks simultaneously is small. Thus, the set of $\mathcal{N}_i(t)$ can be simplified as {0, 1, 2+}, where, "0", "1", and "2+" indicate that the number of the drone-cell networks covering a user i is zero, one and not less than two, respectively. Besides, for preset event $\upsilon_i$, this embodiment divides the interval [0, $u_i^{max}$] into $K_R$ segments uniformly. If $$R_i(t) \in \left[\frac{(i_k - 1)u_i^{max}}{K_R}, \frac{i_k u_i^{max}}{K_R}\right),$$

where $i_k = 1, 2, \ldots, K_R$, then $R_i(t)$ belongs to the $i_k$-th segment. To sum up, this embodiment can simplify the value space $\Omega_i$ of the preset event $\upsilon_i$ as $\Omega_i^s = \{0, 1, 2+\} \times \{1, 2, \ldots, K_R\}$. Note that the value space of $\omega_i$ is still $\Omega_i$. For all $\omega_i \in \Omega_i$ and $\upsilon_i \in \Omega_i^s$, $\omega_i = \upsilon_i$ in the constraint (14) indicates that $\omega_i$ is the original form of $\upsilon_i$, and in the constraint (13), $\varphi_i(\omega_i) = \varphi_i(\upsilon_i | \upsilon_i = \omega_i)$ with $\upsilon_i = \omega_i$ indicating that $\upsilon_i$ is the simplified form of $\omega_i$.

Second, this embodiment simplifies the value space $\mathcal{A}_i$ of the preset action $\beta_i$. Owing to the homogeneity of drone-cells, this embodiment does not identify the index of the drone-cell network that a user i chooses to access for the preset action $\beta_i$. Meanwhile, since the individual utility $u_i(t)$ of a user i at time slot t equals zero when the user i accesses to the empty network according to Definition 1, this embodiment does not consider the preset action of accessing to the empty network, i.e., $\beta_i \neq 0$. Therefore, this embodiment simplifies the value space $\mathcal{A}_i$ of the preset action $\beta_i$ as $\mathcal{A}_i^s = \{$cellular, drone-cell$\}$, where "cellular" and "drone-cell" indicate that the user i chooses to access to a cellular network and a drone-cell network, respectively. Besides, when choosing to access to a drone-cell network, the user i accesses randomly to an accessible drone-cell network with equal probability. Note that the value space of $\alpha_i$ is still $\mathcal{A}_i$.

Therefore, the value of $|\Omega_i||\mathcal{A}_i^s|$ is reduced to $|\Omega_i^s||\mathcal{A}_i^s| = (|\{0,1,2+\}| \times K_R) \times |\mathcal{A}_i^s| = 6K_R$. Meanwhile, the preset action $\beta_i$=drone-cell is infeasible when there is no accessible drone-cell networks for a user i. Thus, this embodiment can ignore the following preset event-preset action pairs: $\{(0, i_k; \text{drone-cell}), \forall i_k \in \{1, 2, \ldots, K_R\}\}$. In this way, the value of $|\Omega_i^s||\mathcal{A}_i^s|$ is further reduced to $6K_R - K_R = 5K_R$. Finally, the total number of the CCE constraints (13) and (14) is reduced to $N + \sum_{i \in \mathcal{I}} |\Omega_i^s||\mathcal{A}_i^s| = (5K_R+1)N$.

In actual scenarios, some users have a requirement of minimum time average utilities (MTAU), and this embodiment denotes the set of these users as $S_u$. Therefore, the game manager 202 must guarantee the utilities of these users meet the following MTAU constraints:

$$\bar{u}_i \geq u_i^c, \forall i \in S_u \tag{15}$$

Based on the above analysis, the constructed first selection model includes: a first objective function and a first constraint. The first constraint includes: a first coarse correlated equilibrium constraint, a first minimum individual time average utility constraint and a first action probability constraint. The constructed first selection model is as follows:

$$\underset{Pr[\alpha|\omega]\varphi_i(v_i)}{\text{Maximize}} \phi(\bar{u}_1, \ldots, \bar{u}_N) \tag{16}$$

subject to:

$$\bar{u}_i = \sum_{\omega \in \Omega} \sum_{\alpha} \pi[\omega] Pr[\alpha|\omega] \hat{u}_i(\alpha, \omega), \forall i \in \mathcal{I}$$

$$\sum_{\omega \in \Omega} \sum_{\alpha} \pi[\omega] Pr[\alpha|\omega] \hat{u}_i(\alpha, \omega) \geq \sum_{\omega \in \Omega} \sum_{\alpha} \pi[\omega] Pr[\alpha|\omega] \varphi_i(\omega_i),$$

$$\forall i \in \mathcal{I}$$

$$\sum_{\omega \in \Omega | \omega_i = v_i} \sum_{\alpha} \pi[\omega] Pr[\alpha|\omega] \varphi_i(v_i) \geq$$

$$\sum_{\omega \in \Omega | \omega_i = v_i} \sum_{\alpha} \pi[\omega] Pr[\alpha|\omega] \hat{u}_i((\beta_i, \alpha_{\bar{i}}), \omega)$$

$$\forall i \in \mathcal{I}, v_i \in \Omega_i^s, \beta_i \in \mathcal{A}_i^s$$

$$\bar{u}_i \geq u_i^c, \forall i \in S_u$$

$$Pr[\alpha|\omega] \geq 0, \forall \alpha \in \mathcal{A}, \omega \in \Omega$$

$$Pr[\alpha|\omega] = 0, \forall \alpha \notin \mathcal{A}(\omega), \omega \in \Omega$$

$$\sum_{\alpha} Pr[\alpha|\omega] = 1, \forall \omega \in \Omega$$

S106: obtaining a value of an action probability according the first selection model, and determining networks that the users choose to access according to the value of the action probability.

The objective of the game manager 202 is to solve the first selection model to obtain the action probability $Pr[\alpha|\omega]$, and to choose suggestion vector $s(t)=\alpha(t)$ according to $Pr[\alpha|\omega]$ to determine the networks that the users choose to access according to the suggestion vector.

The network selection method provided by this embodiment includes: acquiring the dynamic network model and the dynamic user model, generating the random event vector according to the dynamic network model and the dynamic user model, constructing the first selection model according to the random event vector and the action vector, obtaining the value of the action probability according to the first selection model to determine the networks that the users choose to access according to the value of the action probability. This embodiment solves the problem that the existing game-theory-based approaches cannot solve the network selection problem for the integrated cellular and drone-cell networks because the integrated cellular and drone-cell networks are highly dynamic, and the network state is hard to predict.

Although the above problem (16) is a convex optimization problem, it is highly challenging to solve it owing to the following two reasons: 1) $\pi[\omega]$ is essential to solve this problem (16); however, it may be impossible to obtain $\pi[\omega]$ because $\pi[\omega]$ is influenced by various factors such as network capacity, the mobility of drones and users, and user traffic. 2) The size of the variable $Pr[\alpha|\omega]$ is $$\prod_{i \in \mathcal{I}} |\mathcal{A}_i| \prod_{i \in \mathcal{I} \cup \{0\}} |\Omega_i|,$$

which increases exponentially with the increasing number of users. To solve these issues, this embodiment converts this challenging problem into a new problem without knowing $\pi[\omega]$, and the size of the new problem is greatly reduced.

This embodiment illustrates a network selection method according to another exemplary embodiment, which differs from the embodiment illustrated in FIG. 2 in that, after S104, it includes:

S1051: constructing a second selection model.

More specifically, for a real-valued stochastic process u(t) over time slots $t \in \{0, 1, 2, \ldots\}$, this embodiment defines its time average expectation over the first t time slots as:

$$\bar{u}(t) = \frac{1}{t} \sum_{\tau=0}^{t-1} E[u(\tau)] \tag{17}$$

For all $i \in \mathcal{I}$, $v_i \in \Omega_i^s$ and $\beta_i \in \mathcal{A}_i^s$, this embodiment defines:

$$u_{i,v_i}^{(\beta_i)}(t) \triangleq \hat{u}_i((\beta_i, \alpha_{\bar{i}}(t)), \omega(t)) 1\{\omega_i(t) = v_i\} \tag{18}$$

By the stochastic process theory, this embodiment converts the first selection model (16) equivalently into the second selection model, where the second selection model includes a second objective function and a second constraint, where the second objective function is a proportional fairness function with the time average expectation of the individual utilities as independent variables, and the second constraint includes at least second coarse correlated equilibrium constraints, a second minimum individual time average utility constraint and a second auxiliary variable constraint, where the second coarse correlated equilibrium constraints are used for constraining the time average expectation of the individual utilities and the time average expectation of second auxiliary variables, the second minimum individual time average utility constraint is used for constraining the time average expectation of the individual utilities, and the second auxiliary variable constraint is used for constraining the second auxiliary variables. At each time slot t∈{0, 1, 2, . . . }, the game manager 202 observes the random event vector ω(t)∈Ω, and solves an action vector α(t)∈$\mathcal{A}$ (t) and variables $\varphi_{i,\upsilon_i}(t)$, where $\varphi_{i,\upsilon_i}(t)$ represent the second auxiliary variable at time slot t.

$$\underset{\alpha(t),\varphi_{i,\upsilon_i}}{\text{Maximize}} \underset{t\to\infty}{\text{liminf}} \phi(\overline{u}_1(t), \ldots, \overline{u}_N(t)) \qquad (19)$$

subject to:

$$\underset{t\to\infty}{\text{liminf}}\left[\overline{u}_i(t) - \sum_{\upsilon_i\in\Omega_i^s} \overline{\varphi}_{i,\upsilon_i}(t)\right] \geq 0, \forall i \in \mathcal{I}$$

$$\underset{t\to\infty}{\text{liminf}}\left[\overline{\varphi}_{i,\upsilon_i}(t) - \overline{u}_{i,\upsilon_i}^{(\beta_i)}(t)\right] \geq 0, \forall i \in \mathcal{I}, \upsilon_i \in \Omega_i^s, \beta_i \in \mathcal{A}_i^s$$

$$0 \leq \varphi_{i,\upsilon_i}(t) \leq u_i^{max}1\{\omega_1(t)=\upsilon_i\}, \forall t \in \{0, 1, 2, \ldots\}, i \in \mathcal{I},$$

$$\upsilon_i \in \Omega_i^s$$

$$\underset{t\to\infty}{\text{liminf}}[\overline{u}_i(t) - u_i^c(t)] \geq 0, \forall i \in \mathcal{S}_u$$

$$\alpha(t) \in \mathcal{A}(t), \forall t \in \{0, 1, 2, \ldots\}$$

S106: obtaining a value of the action vector according to the second selection model, and determining the networks that the users choose to access according to the value of the action vector.

In the network selection method provided in this embodiment, the constructed second selection model is based on the time average expectation of the individual utilities, the action vector can be obtained when the probability of the random event vector is unknown, and the networks that the users choose to access are determined according to the value of the action vector.

This embodiment illustrates a network selection method according to another exemplary embodiment, which differs from the previous embodiment in that, after S1051, it further includes:

S1052: constructing a third selection model.

More specifically, the objective of the above problem (19) is to maximize a nonlinear function of time average. In order to convert it equivalently into a maximization of the time average of a nonlinear function, this embodiment introduces a third auxiliary vector γ(t)=(γ$_1$(t), . . . , γ$_N$(t)) with 0≤γ$_i$(t) ≤u$_i^{max}$ for all i∈$\mathcal{I}$, and defines g(t)=ϕ(γ$_1$(t), . . . , γ$_N$(t)). Then, the Jensen's inequality indicates that $$\overline{g}(t) \leq \phi(\overline{\gamma}_1(t), \ldots, \overline{\gamma}_N(t)) \qquad (20)$$

This embodiment considers converting the second selection model (19) into a third selection model (21.1) by leveraging the Jensen's inequality. Where the third selection model includes a third objective function and a third constraint, and the third objective function (21.1) is time average expectation of a proportional fairness function with the third auxiliary variables as independent variables, and the third constraint includes at least the second coarse correlated equilibrium constraints (21.4) and (21.5), the second minimum individual time average utility constraint (21.7), the second auxiliary variable constraint (21.6) and third auxiliary variable constraints (21.2) and (21.3). At each time slot t∈{0, 1, 2, . . . }, the game manager 202 observes the random event vector ω(t)∈Ω and chooses an action vector α(t)∈$\mathcal{A}$ (t), variables $\varphi_{i,\upsilon_i}(t)$ and an auxiliary vector γ(t) to solve:

$$\underset{\alpha(t),\varphi_{i,\upsilon_i}(t),\gamma(t)}{\text{Maximize}} \underset{t\to\infty}{\text{liminf}} \overline{g}(t) \qquad (21.1)$$

subject to:

$$\underset{t\to\infty}{\lim}|\overline{\gamma}_i(t) - \overline{u}_i(t)| = 0, \forall i \in \mathcal{I} \qquad (21.2)$$

$$0 \leq \gamma_i(t) \leq u_i^{max}, \forall t \in \{0, 1, 2, \ldots\}, i \in \mathcal{I} \qquad (21.3)$$

$$\underset{t\to\infty}{\text{liminf}}\left[\overline{u}_i(t) - \sum_{\upsilon_i\in\Omega_i^s} \overline{\varphi}_{i,\upsilon_i}(t)\right] \geq 0, \forall i \in \mathcal{I} \qquad (21.4)$$

$$\underset{t\to\infty}{\text{liminf}}\left[\overline{\varphi}_{i,\upsilon_i}(t) - \overline{u}_{i,\upsilon_i}^{(\beta_i)}(t)\right] \geq 0, \forall i \in \mathcal{I}, \upsilon_i \in \Omega_i^s, \beta_i \in \mathcal{A}_i^s \qquad (21.5)$$

$$0 \leq \varphi_{i,\upsilon_i}(t) \leq u_i^{max}1\{\omega_1(t)=\upsilon_i\}, \forall t \in \{0, 1, 2, \ldots\}, i \in \mathcal{I}, \qquad (21.6)$$
$$\upsilon_i \in \Omega_i^s$$

$$\underset{t\to\infty}{\text{liminf}}[\overline{u}_i(t) - u_i^c] \geq 0, \forall i \in \mathcal{S}_u \qquad (21.7)$$

$$\alpha(t) \in \mathcal{A}(t), \forall t \in \{0, 1, 2, \ldots\} \qquad (21.8)$$

where, the second coarse correlated equilibrium constraints (21.4) and (21.5) are used to constrain the time average expectation of the individual utilities and the time average expectation of the second auxiliary variables, the second minimum individual time average utility constraint (21.7) is used to constrain the time average expectation of the individual utilities, the second auxiliary variable constraint (21.6) is used to constrain the second auxiliary variables, and the third auxiliary variable constraints (21.2) and (21.3) are used to constrain the time average expectation of the third auxiliary variables and the time average expectation of the individual utilities.

S106: obtaining the value of the action vector according to the third selection model, and determining the networks that the users choose to access according to the value of the action vector.

In the network selection method provided in this embodiment, the time average expectation of the proportional fairness function with the third auxiliary variables as independent variables is taken as the third objective function, so that the objective function can be simplified to obtain the action vector according to the third selection model.

This embodiment illustrates a network selection method according to another exemplary embodiment, which differs from the previous embodiment in that, after S1052, it includes:

S1053: converting the third selection model into a fourth selection model by leveraging a drift-plus-penalty technique.

Considering the principle of the drift-plus-penalty technique, as for the constraint (21.1), this embodiment defines the first term Q$_i$(t) of the first virtual queue for all i∈$\mathcal{I}$ as the following form:

$$Q_i(t+1) = Q_i(t) + \sum_{\upsilon_i\in\Omega_i^s} \varphi_{i,\upsilon_i}(t) - u_i(t) \qquad (22)$$

The constraint (21.4) can be satisfied, if the following mean-rate stability condition is held:

$$\lim_{t\to\infty} \frac{E[[Q_i(t)]^+]}{t} = 0 \quad (23)$$

where, the nonnegative operation $[x]^+ = \max\{x, 0\}$.

Likewise, to enforce the constraints (21.1), (21.1) and (21.1), this embodiment defines other three types of virtual queues, respectively. The second item $D_{i,v_i}^{(\beta_i)}(t)$ of the first virtual queue is defined for all $i \in \mathcal{I}$, $v_i \in \Omega_i^s$, and $\beta_i \in \mathcal{A}_i^s$:

$$D_{i,v_i}^{(\beta_i)}(t+1) = D_{i,v_i}^{(\beta_i)}(t) + u_{i,v_i}^{(\beta_i)}(t) - \varphi_{i,v_i}(t) \quad (24)$$

The second virtual queue $Z_i(t)$ is defined for all $i \in \mathcal{I}$:

$$Z_i(t+1) = Z_i(t) + \gamma_i(t) - u_i(t) \quad (25)$$

The third virtual queue $H_i(t)$ is defined for all $i \in S_u$:

$$H_i(t+1) = H_i + u_i^c - u_i(t) \quad (26)$$

And the constraints (21.1), (21.1) and (21.1) can be satisfied, if the following mean-rate stability conditions are held:

$$\lim_{t\to\infty} \frac{E[[D_{i,v_i}^{(\beta_i)}(t)]^+]}{t} = 0 \quad (27)$$

$$\lim_{t\to\infty} \frac{E[Z_i(t)]}{t} = 0 \quad (28)$$

$$\lim_{t\to\infty} \frac{E[[H_i(t)]^+]}{t} = 0 \quad (29)$$

For simplicity, this embodiment assumes that all virtual queues are initialized to zero.

According the formulas (22), (24), (25) and (26), the first virtual value in the first virtual queue at the current time slot is generated according to the violation of the second coarse correlated equilibrium constraints at the previous time slot and the first virtual value in the first virtual queue at the previous time slot. The second virtual value in the second virtual queue at the current time slot is generated according to the violation of the third auxiliary variable constraints at the previous time slot and the second virtual value in the second virtual queue at the previous time slot. The third virtual value in the third virtual queue at the current time slot is generated according to the violation of the second minimum individual time average utility constraint at the previous time slot and the third virtual value in the third virtual queue at the previous time slot.

This embodiment defines a function $L(t)$ as a sum of squares of all four types of queues $[Q_i(t)]^+$, $[D_{i,v_i}^{(\beta_i)}(t)]^+$, $Z_i(t)$ and $[H_i(t)]^+$ (divided by 2 for convenience) at time slot t, which is called a Lyapunov function as the total violation:

$$L(t) \triangleq \frac{1}{2}\sum_{i\in\mathcal{I}}([Q_i(t)]^+)^2 + \quad (30)$$
$$\frac{1}{2}\sum_{i\in\mathcal{I}}\sum_{v_i\in\Omega_i^s,\beta_i\in\mathcal{A}_i^s}([D_{i,v_i}^{(\beta_i)}(t)]^+)^2 + \frac{1}{2}\sum_{i\in\mathcal{I}}Z_i(t)^2 + \frac{1}{2}\sum_{i\in\mathcal{I}}([H_i(t)]^+)^2$$

where, $H_i(t) = 0$ for all $i \notin S_u$.

Besides, this embodiment defines a drift-plus-penalty expression as $\Delta(t) - Vg(t)$, where $\Delta(t) = L(t+1) - L(t)$ represents a Lyapunov drift, that is, the drift value of the total violation, $-g(t)$ is a "penalty", $g(t)$ is the proportional fairness function with the third auxiliary variables as independent variables, and V is a non-negative penalty coefficient that affects a trade-off between the constraint violation and the optimality. The drift-plus-penalty expression satisfies the following condition: minimizing the constraint violation and maximizing the objective. Therefore, the fourth selection model is constructed as follows:

$$\Delta(t) - Vg(t) \leq \quad (31)$$
$$B + \sum_{i\in\mathcal{I}}[H_i(t)]^+ u_i^c - V\phi(\gamma_1(t), \ldots, \gamma_N(t)) + \sum_{i\in\mathcal{I}}Z_i(t)\gamma_i(t) +$$
$$\sum_{i\in\mathcal{I}}\left\{[Q_i(t)]^+ \sum_{v_i\in\Omega_i^s}\varphi_{i,v_i}(t)\right\} - \sum_{i\in\mathcal{I}}\sum_{v_i\in\Omega_i^s,\beta_i\in\mathcal{A}_i^s}[D_{i,v_i}^{(\beta_i)}(t)]^+\varphi_{i,v_i}(t) +$$
$$\sum_{i\in\mathcal{I}}\sum_{v_i\in\Omega_i^s,\beta_i\in\mathcal{A}_i^s}[D_{i,v_i}^{(\beta_i)}(t)]^+ u_{i,v_i}^{(\beta_i)}(t) -$$
$$\sum_{i\in\mathcal{I}}\{[Q_i(t)]^+ + Z_i(t) + [H_i(t)]^+\}u_i(t)$$

where a penalty upper bound includes: a constant term, a first penalty upper bound term, a second penalty upper bound term and a third penalty upper bound term. The constant term is $$B \triangleq \sum_{i\in\mathcal{I}}(u_i^{max})^2 + \frac{1}{2}\sum_{i\in S_u}(u_i^{max})^2 + \frac{1}{2}\sum_{i\in\mathcal{I}}|\mathcal{A}_i^s|(u_i^{max})^2,$$

the first penalty upper bound term is $$-V\phi(\gamma_1(t), \ldots, \gamma_N(t)) + \sum_{i\in\mathcal{I}}Z_i(t)\gamma_i(t),$$

the second penalty upper bound term is $$\sum_{i\in\mathcal{I}}\left\{[Q_i(t)]^+ \sum_{v_i\in\Omega_i^s}\varphi_{i,v_i}(t)\right\} - \sum_{i\in\mathcal{I}}\sum_{v_i\in\Omega_i^s,\beta_i\in\mathcal{A}_i^s}[D_{i,v_i}^{(\beta_i)}(t)]^+\varphi_{i,v_i}(t)$$

and the third penalty upper bound term is $$\sum_{i\in\mathcal{I}}\sum_{v_i\in\Omega_i^s,\beta_i\in\mathcal{A}_i^s}[D_{i,v_i}^{(\beta_i)}(t)]^+ u_{i,v_i}^{(\beta_i)}(t) - \sum_{i\in\mathcal{I}}\{[Q_i(t)]^+ + Z_i(t) + [H_i(t)]^+\}u_i(t).$$

S106: obtaining the value of the action vector according the fourth selection model, and determining the networks that the users choose to access according to the value of the action vector.

In the network selection method provided in this embodiment, the fourth selection model is an inequality form, and this model is simple and easy to obtain the action vector according to the fourth selection model.

This embodiment illustrates a network selection method according to another exemplary embodiment, which differs from the previous embodiment in that: S106: obtaining the value of the action vector according the fourth selection model, and determining the networks that the users choose to access according to the value of the action vector, specifically including the following steps:

S1061: at each time slot t, the game manager 202 observes the first term $Q_i(t)$ of the first virtual value in the first virtual queue at the current time slot, the second term $D_{i,\upsilon_i}^{(\beta_i)}(t)$ of the first virtual value in the first virtual queue at the current time slot, the second virtual value $Z_i(t)$ in the second virtual queue at the current time slot, the third virtual value $H_i(t)$ in the third virtual queue at the current time slot and the random event vector $\omega(t) \in \Omega$.

This embodiment solves the problem (21.1) by minimizing the upper bound of $\Delta(t)-Vg(t)$ at each time slot t greedily. Meanwhile, the upper bound of $\Delta(t)-Vg(t)$ can be decomposed into four independent terms. At each time slot t, the first term is a constant, the second term is a function of the third auxiliary vector $\gamma(t)$, the third term is a function of the second auxiliary variables $\varphi_{i,\upsilon_i}(t)$, and the forth term is a function of the individual utilities $u_i(t)$ and $u_{i,\upsilon_i}^{(\beta_i)}(t)$.

S1062: choosing the value of the third virtual variables $\gamma_i(t)$ for all $i \in \mathcal{I}$ according to the second virtual value at the current time slot and the first penalty upper bound term to solve:

$$\text{Minimize} - V\phi(\gamma_1(t), \ldots, \gamma_N(t)) + \sum_{i \in I} Z_i(t)\gamma_i(t) \quad (32)$$

$$\text{subject to: } 0 \le \gamma_i(t) \le u_i^{max}, \forall i \in \mathcal{I}$$

The closed-form solution of the problem (32) can take the following form for all $i \in \mathcal{I}$:

$$\gamma_i(t) = \begin{cases} u_i^{max}, & Z_i(t) \le 0 \\ \min\left\{\frac{V}{Z_i(t)\ln 2}, u_i^{max}\right\}, & Z_i(t) > 0 \end{cases} \quad (33)$$

S1063: choosing the value of the second virtual variables $\varphi_{i,\upsilon_i}(t)$ for all $i \in \mathcal{I}$ and $\upsilon_i \in \Omega_i^s$ according to the random event vector, the first virtual value at the current time slot and the second penalty upper bound term to solve:

$$\text{Minimize} \sum_{i \in I} \left\{[Q_i(t)]^+ \sum_{\upsilon_i \in \Omega_i^s} \varphi_{i,\upsilon_i}(t)\right\} - \quad (34)$$

$$\sum_{i \in I} \sum_{\upsilon_i \in \Omega_i^s, \beta_i \in A_i^s} \left[D_{i,\upsilon_i}^{(\beta_i)}(t)\right]^+ \varphi_{i,\upsilon_i}(t)$$

$$\text{subject to: } 0 \le \varphi_{i,\upsilon_i}(t) \le u_i^{max} 1\{\omega_i(t) = \upsilon_i\} \forall i \in \mathcal{I}, \upsilon_i \in \Omega_i^s$$

The closed-form solution of the problem (34) can take the following form for all $i \in \mathcal{I}$ and $\upsilon_i \in \Omega_i^s$:

$$\varphi_{i,\upsilon_i}(t) = \begin{cases} u_i^{max}, & \omega_i(t) = \upsilon_i, [Q_i(t)]^+ < \sum_{\beta_i \in A_i^s} \left[D_{i,\upsilon_i}^{(\beta_i)}(t)\right]^+ \\ 0, & \text{otherwise} \end{cases} \quad (35)$$

S1064: choosing the value of the action vector $\alpha(t)$ according to the random event vector, the first virtual value at the current time slot, the second virtual value at the current time slot, the third virtual value at the current time slot and the third penalty upper bound term to solve:

$$\text{Maximize} - \sum_{i \in I} \sum_{\upsilon_i \in \Omega_i^s, \beta_i \in A_i^s} \left[D_{i,\upsilon_i}^{(\beta_i)}(t)\right]^+ u_{i,\upsilon_i}^{(\beta_i)}(t) + \quad (36)$$

$$\sum_{i \in I} \{[Q_i(t)]^+ + Z_i(t) + [H_i(t)]^+\} u_i(t)$$

$$\text{subject to: } \alpha(t) \in \mathcal{A}(t)$$

S1065: sending $\alpha_i(t)$ to each player 203-i, so that the player 203-i determines the network to choose to access according to the action $\alpha_i(t)$.

The individual utilities $u_i(t)$ and $u_{i,\upsilon_i}^{(\beta_i)}(t)$ are computed according to formulas (14) and (18), respectively. The virtual queues $Q_i(t)$, $D_{i,\upsilon_i}^{(\beta_i)}(t)$, $Z_i(t)$ and $H_i(t)$ are updated according to formulas (22), (24), (25) and (26), respectively.

The problem (36) is a non-linear integer programming problem, where $u_i(t)$ and $u_{i,\upsilon_i}^{(\beta_i)}(t)$ are complicate non-linear functions of $\alpha(t)$. The exhaustive algorithm for solving the problem (36) has a complexity of $$O\left(\prod_{i \in I} |\mathcal{A}_i(t)|\right),$$

which increases exponentially with the increasing number of users. Although heuristic algorithms (e.g., genetic algorithm) can be leveraged to mitigate this problem, it may require a long processing time due to its slow convergence rate. To accelerate the optimization process, this embodiment designs a linear approximation mechanism for the problem (36).

According to Definition 1, the network $j \in \mathcal{J} \setminus \{0\}$ may be congested when the following condition is held: $\sum_{i \in \mathcal{I}} 1\{\alpha_i(t)=j\}R_i(t) > x_b C_j(t)$. To avoid this situation, the suggested action vector $\alpha(t)$ formulated by the game manager 202 should satisfy the first action vector constraint:

$$\sum_{i \in I} 1\{\alpha_i(t) = j\}R_i(t) \le x_b C_j(t), \forall j \in \mathcal{J} \setminus \{0\} \quad (37)$$

For each participating player 203-$i \in \mathcal{I}$, according to Definition 1, if $\alpha_i(t)=0$, $u_i(t)=0$. According to both the constraint (37) and Definition 1, if $\alpha_i(t) \ne 0$, $u_i(t)=R_i(t)$. Therefore, the utility function $u_i(t)$ in both cases can be calculated in the following way, thereby forming a mapping table between the individual utilities and the transmission rate of the participating players:

$$u_i(t) = 1\{\alpha_i(t) \ne 0\} R_i(t) \quad (38)$$

For each non-participating player 203-$i \in \mathcal{I}$, and for each $\upsilon_i \in \Omega_i^s$ and $\beta_i \in \mathcal{A}_i^s$, ($\beta_i \neq 0$), this embodiment considers the definition (18) of $u_{i,\upsilon_i}^{(\beta_i)}(t)$. If $\upsilon_i \neq \omega_i(t)$, $u_{i,\upsilon_i}^{(\beta_i)}(t)=0$. If $\upsilon_i = \omega_i(t)$, $u_{i,\upsilon_i}^{(\beta_i)}(t) = \hat{u}_i((\beta_i, \alpha_i(t)), \omega(t))$. And this embodiment can estimate $u_{i,\upsilon_i}^{(\beta_i)}(t)$ according to the following two different cases, thereby forming a mapping table between the individual utilities and the transmission rate of the non-participating players.

1) If the player 203-$i$ accesses to a network that is just the one suggested by the game manager 202, i.e., $\beta_i = \alpha_i(t)$, then $u_{i,\upsilon_i}^{(\beta_i)}(t) = R_i(t)$.

2) If the player 203-$i$ accesses to a network that is not the one suggested by the game manager 202, i.e., $\beta_i \neq \alpha_i(t)$, then this embodiment estimates the effective transmission ratio of the network $j=\beta_i$ at time slot t (denoted by $\theta_{i,\beta_i}(t)$). Specifically, this embodiment defines the remaining capacity of the network $j \in \mathcal{J} \setminus \{0\}$ at time slot t as $C_j^r(t) = x_b C_j(t) \sum_{i \in \mathcal{I}} 1\{\alpha_i(t)=j\} R_i(t)$, and assumes that $C_j^r(t) = C_j^r(t-1)$. As a result, $u_{i,\upsilon_i}^{(\beta_i)}(t)$ can take the following formula:

$$u_{i,\upsilon_i}^{(\beta_i)}(t) = \theta_{i,\beta_i}(t) R_i(t) \quad (39)$$

where, $$\theta_{i,\beta_i}(t) = f\left( \frac{[x_b C_{\beta_i}(t) - C_{\beta_i}^r(t-1)]^+ + R_i(t)}{C_{\beta_i}(t)} \right),$$

$C_{\beta_i}(t)$ represents the capacity of the network corresponding to $\beta_i$.

Therefore, $u_{i,\upsilon_i}^{(\beta_i)}(t)$ can be estimated by:

$$u_{i,\upsilon_i}^{(\beta_i)}(t) = \begin{cases} 0, & \upsilon_i \neq \omega_i(t) \\ R_i(t), & \upsilon_i = \omega_i(t), \beta_i = \alpha_i(t) \\ \theta_{i,\beta_i}(t) R_i(t), & \upsilon_i = \omega_i(t), \beta_i \neq \alpha_i(t) \end{cases} \quad (40)$$

Next, this embodiment discusses how to transform the problem (36) into an integer linear programming problem by introducing a set of auxiliary variables $a_{ij}$, where $\{a_{ij}\}$ is a suggestion matrix. For all $i \in \mathcal{I}$ and $j \in \mathcal{J}$, this embodiment defines the mapping relationship between the suggestion matrix and the action vector as:

$$a_{ij} = \begin{cases} 1, & \alpha_i(t) = j \\ 0, & \text{otherwise} \end{cases},$$

where $a_{ij}=1$ indicates that the game manager 202 suggests the player 203-$i$ access to the network $j$, and $a_{ij}=0$ indicates that the game manager 202 suggests the player 203-$i$ not access to the network $j$. According to the definition of $a_{ij}$ and the constraint $\alpha(t) \in \mathcal{A}(t)$, the suggestion matrix constraint can be obtained:

$$\sum_{j \in \mathcal{J}} a_{ij} = 1, \forall i \in \mathcal{I} \quad (41)$$

-continued $$a_{ij} \in \{0, 1\}, \forall i \in \mathcal{I}, j \in \mathcal{J} \quad (42)$$

$$a_{ij} = 0, \forall i \in \mathcal{I}, j \notin \mathcal{A}_i(t) \quad (43)$$

$\alpha(t)$ in (37) is substituted with the variables $a_{ij}$, and the second action vector constraint can be obtained:

$$\sum_{i \in \mathcal{I}} a_{ij} R_i(t) \leq x_b C_j(t), \forall j \in \mathcal{J} \setminus \{0\} \quad (44)$$

$\alpha(t)$ in (37) is substituted with the variables $a_{ij}$, and the individual utilities of the participating players can be obtained:

$$u_i(t) = R_i(t) \sum_{j \in \mathcal{J} \setminus \{0\}} a_{ij}, \forall i \in \mathcal{I} \quad (45)$$

Furthermore, this embodiment lets $$\theta_{i,j}^{(\beta_i)} = \begin{cases} 1, & j = \beta_i \\ \theta_{i,\beta_i}(t), & j \neq \beta_i \end{cases}$$

for all $i \in \mathcal{I}$, $j \in \mathcal{J}$ and $\beta_i \in \mathcal{A}_i^s$. $\alpha(t)$ in (40) is substituted with the variables $a_{ij}$, and the individual utilities of the non-participating players can be obtained:

$$u_{i,\upsilon_i}^{(\beta_i)}(t) \triangleq \hat{u}_i((\beta_i, \alpha_{\bar{i}}(t)), \omega(t)) 1\{\omega_i(t) = \upsilon_i\},$$
$$\forall i \in \mathcal{I}, \upsilon_i \in \Omega_i^s, \beta_i \in \mathcal{A}_i^s \quad (46)$$

According to (41)-(46), this embodiment can transform the problem (36) into the following integer linear programming problem:

$$\underset{\{a_{ij}\}}{\text{Maximize}} \sum_{i \in \mathcal{I}} \sum_{j \in \mathcal{J}} c_{ij} a_{ij} \quad (47)$$

subject to:

$$\sum_{i \in \mathcal{I}} R_i(t) a_{ij} \leq x_b C_j(t), \forall j \in \mathcal{J} \setminus \{0\}$$

$$\sum_{j \in \mathcal{J}} a_{ij} = 1, \forall i \in \mathcal{I}$$

$$a_{ij} \in \{0, 1\}, \forall i \in \mathcal{I}, j \in \mathcal{J}$$

$$a_{ij} = 0, \forall i \in \mathcal{I}, j \notin \mathcal{A}_i(t)$$

where, the weights $c_{ij}$ are defined as:

$$c_{ij} = \begin{cases} (E_i(t) - F_{ij}(t)) R_i(t), & \forall j \in \mathcal{J} \setminus \{0\} \\ -F_{ij}(t) R_i(t), & j = 0 \end{cases} \quad (48)$$

where $$E_i(t) = [Q_i(t)]^+ + Z_i(t) + [H_i(t)]^+$$

and

-continued $$F_{ij}(t) = \sum_{v_i \in \Omega_i^s, \beta_i \in A_i^s} \left[D_{i,v_i}^{(\beta_i)}(t)\right]^+ \theta_{ij}^{(\beta_i)} 1\{\omega_i(t) = v_i\}.$$

$$\sum_{i \in I} \sum_{j \in \mathcal{J}} c_{ij} a_{ij}$$

is the fourth penalty upper bound term, $$\sum_{i \in I} R_i(t) a_{ij} \le x_b C_j(t), \ \forall \ j \in \mathcal{J} \backslash \{0\}$$

constitutes the second action vector constraint, and $$\begin{cases} \sum_{j \in \mathcal{J}} a_{ij} = 1, \forall i \in \mathcal{I} \\ a_{ij} \in \{0, 1\}, \forall i \in \mathcal{I}, j \in \mathcal{J} \\ a_{ij} = 0, \forall i \in \mathcal{I}, j \notin \mathcal{A}_i(t) \end{cases}$$

constitutes the suggestion matrix constraint.

Note that at the initial time slot (t=0), all weights $c_{ij}$ will be zero since all virtual queues are initialized to zero. To handle this problem, this embodiment defines the weights $c_{ij}$ at time slot t=0 as:

$$c_{ij} = \begin{cases} R_i(0), & \forall \ j \in \mathcal{J} \backslash \{0\} \\ 0, & j = 0 \end{cases} \quad (49)$$

The problem (47) is an integer linear programming problem with respect to the auxiliary variables $a_{ij}$ that can be solved by the MOSEK Optimization Tools. Furthermore, in the MOSEK, the branch-and-bound scheme is leveraged to relax the integer variables; thus, the integer linear optimization problem is relaxed to a solvable linear optimization problem.

This embodiment uses the Lyapunov optimization method and the linear approximation mechanism to transform the constructed problem without knowing the state probability $\pi[\omega]$ of the networks and the users, thereby reducing the computational complexity of the problem greatly.

Figure 4:
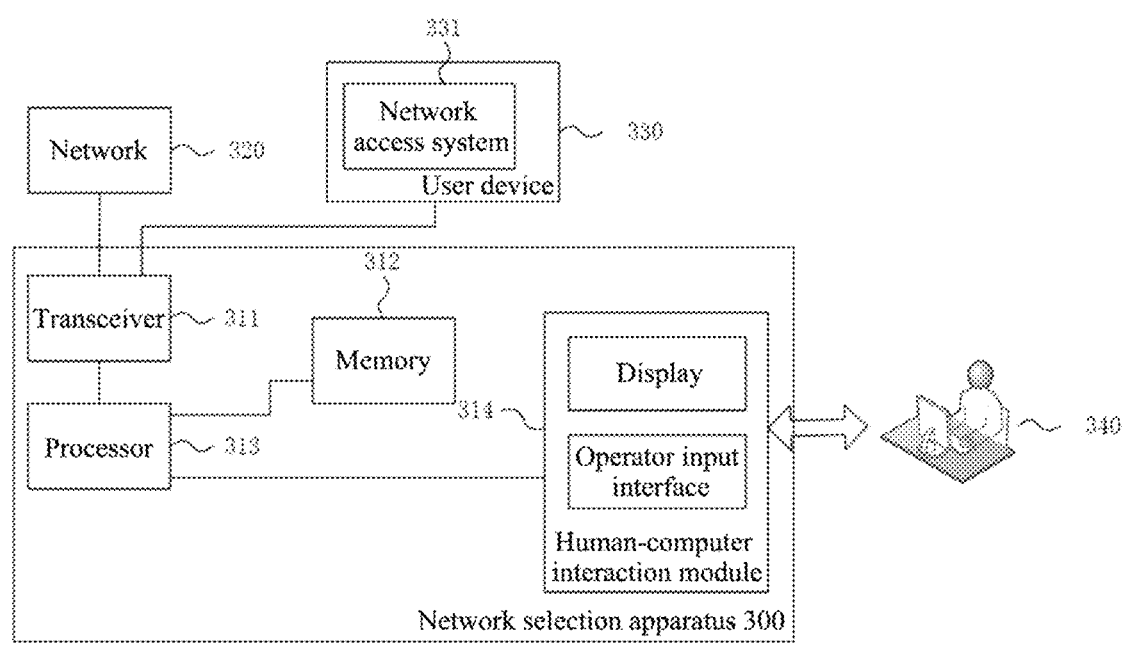
FIG. 4 is a schematic structural diagram of a network selection apparatus for the integrated cellular and drone-cell networks according to an exemplary embodiment of the present disclosure.

Based on the main framework of solving the problem (21), and combined with the solutions of (32), (34) and (36), this embodiment proposes an network selection apparatus for the integrated cellular and drone-cell networks based on the efficient and fair network selection (EFNS) method shown in FIG. 4.

FIG. 4 is a schematic structural diagram of a network selection apparatus for the integrated cellular and drone-cell networks according to an exemplary embodiment of the present disclosure. As shown in FIG. 4, a network selection apparatus 300 includes a transceiver 311 and a memory 312. The transceiver 311 is used for collecting the drone-cell network capacity information $C_j(t)$, $j \in \mathcal{J}_d$, the cellular network capacity information $C_1(t)$, the users' accessible network set information $\mathcal{N}_i(t)$, $i \in \mathcal{I}$, and data transmission rate information $R_i(t)$, $i \in \mathcal{I}$, to form the random event vector $\omega(t)$. Meanwhile, the transceiver 311 is also responsible for transmitting the suggested action information formulated by the game manager 202 to each user device 330. The memory 312 can be any type of computer readable medium, and it is responsible for storing information such as parameters, state data, action data, and virtual queue data. The network selection apparatus 300 further includes a processor 313. The processor 313 can be any type of central processing unit, and it is responsible for processing data in the EFNS method. Specifically, the processor 313 obtains the action vector according to the drone-cell network capacity information, the cellular network capacity information, the users' accessible network set information, and data transmission rate information and the fourth selection model. Each user device 330 includes a network access system 331 for controlling the user device 330 to select a network to access according to the received action. The fourth selection model has been described in detail in the foregoing embodiment, and details are not described herein again.

Referring further to FIG. 4, the network selection apparatus provided by this embodiment also includes a human-computer interaction module 314, which includes a display and an operator input interface. The display can display the results to a computer operator 340. The operator input interface can obtain information inputted by the computer operator 340 from one or more input devices such as a keyboard and a mouse.

Figure 5:
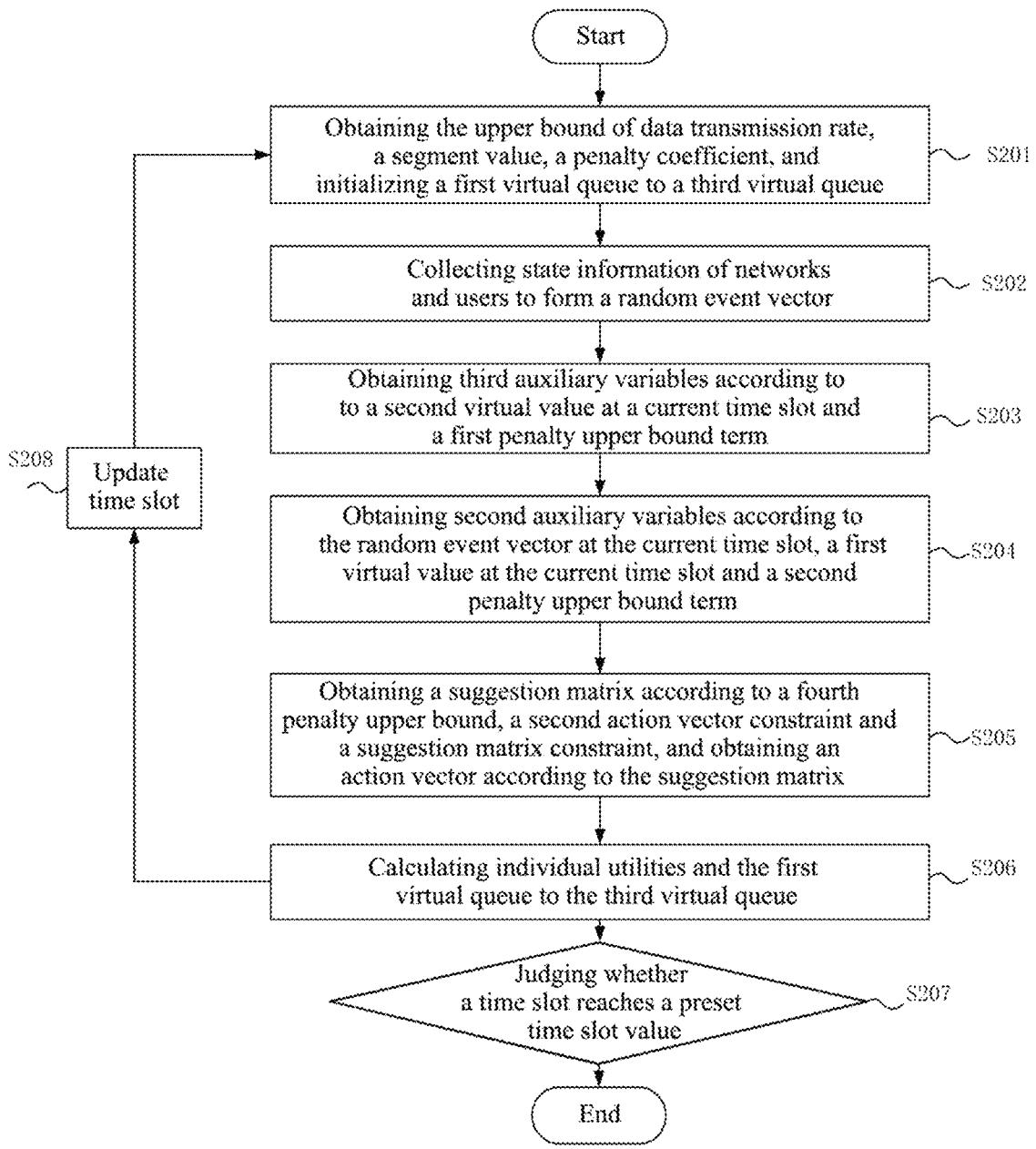
FIG. 5 is a flowchart of the method performed by a processor in the network selection apparatus for the integrated cellular and drone-cell networks according to the embodiment shown in FIG. 4 of the present disclosure.

Referring further to FIG. 4, the network selection apparatus provided by this embodiment further includes networks 320. FIG. 5 is a flowchart of the method performed by a processor in the network selection apparatus for the integrated cellular and drone-cell networks according to the embodiment shown in FIG. 4 of the present disclosure. As shown in FIG. 5, the processor 313 performs the following actions:

The state information $\omega(t)$ and the virtual queue information $Q_i(t)$, $D_{i,v_i}^{(\beta_i)}(t)$, $Z_i(t)$, and $H_i(t)$ at the current time slot t are received. And the output information is the suggested action vector $\alpha(t)$ of the game manager 202 at the current time slot t and the virtual queue information $Q_i(t+1)$, $D_{i,v_i}^{(\beta_i)}(t+1)$, $Z_i(t+1)$, and $H_i(t+1)$ of the next time slot t+1.

S201: obtaining an upper bound $u_i^{max}$ of data transmission rate, a segment value $K_R$, a penalty coefficient V, and initializing a first virtual queue to a third virtual queue.

More specifically, these parameters are stored in the memory 312. These parameters can be given default values, and the computer operator 340 can modify these parameters through the human-computer interaction module 314. The virtual queues $Q_i(0)=0$, $D_{i,v_i}^{(\beta_i)}(0)=0$, $Z_i(0)=0$ and $H_i(0)=0$ are initialized, and these virtual queues are stored in the memory 312.

Steps 2-7 are repeated at each time slot, where T is a total number of the time slots.

S202: collecting state information of networks and users to form a random event vector.

More specifically, the processor 313 collects the state information $\omega(t) \in \Omega$ of the networks and the users through the transceiver 311.

Specifically, $\omega(t)$ will be stored in the memory 312 temporarily until the end of Step 6.

S203: obtaining third auxiliary variables $\gamma_i(t)$ according to a second virtual value at a current time slot and a first penalty upper bound term.

More specifically, for each $i \in \mathcal{I}$, the processor 313 calculates the third auxiliary variables $\gamma_i(t)$ according to the formula (33). The third auxiliary variables $\gamma_i(t)$ will be temporarily stored in the memory 312 until the end of Step 6.

S204: obtaining second auxiliary variables according to the random event vector at the current time slot, a first virtual value at the current time slot and a second penalty upper bound term.

More specifically, for each $i \in \mathcal{I}$ and $v_i \in \Omega_i^s$, the processor 313 calculates the second auxiliary variables $\varphi_{i,v_i}(t)$ by the formula (35). The auxiliary variables $\varphi_{i,v_i}(t)$ will be temporarily stored in the memory 312 until the end of Step 6.

S205: obtaining a suggestion matrix according to a fourth penalty upper bound, a second action vector constraint and a suggestion matrix constraint, and obtaining an action vector according to the suggestion matrix.

More specifically, the processor 313 obtains the suggestion matrix $\{a_{ij}\}$ by solving the problem (47), and obtains the action vector $\alpha(t)$ according to the suggestion matrix $\{a_{ij}\}$. Then the transceiver 311 sends the suggested actions $\alpha_i(t)$ to the network access system 331 of each user device 330-i. The suggested action vector $\alpha(t)$ will be temporarily stored in the memory 312 until the end of Step 6.

S206: calculating individual utilities and the first virtual queue to the third virtual queue.

More specifically, the processor 313 calculates $u_i(t)$ and $u_{i,v_i}^{(\beta_i)}(t)$ using formulas (4) and (18), respectively, calculates $Q_i(t+1)$ $D_{i,v_i}^{(\beta_i)}(t+1)$, $Z_i(t+L)$ and $H_i(t+1)$ using formulas (22), (24), (25) and (26), and updates the virtual queues in the memory 312.

S207: judging whether a time slot t reaches a preset time slot value, if not, turning to S208, otherwise, stopping the loop.

S208: updating the time slot t, and turning to S201.

The following context presents a simulation leveraging the EFNS method provided by this embodiment to perform the network selection for the integrated cellular and drone-cell networks.

In order to verify the effectiveness of the network selection method, this embodiment designs three benchmark comparison methods: the cellular-only (CO) method, the random access (RA) method and the on-the-spot offloading (OTSO) method. For the CO method, at each time slot, every user always chooses to access to the cellular network. For the RA method, at each time slot, every user always accesses randomly to an accessible non-empty network with equal probability. For the OTSO method, at each time slot, every user checks whether the drone-cell networks can be access, and if so, the user accesses randomly to an accessible drone-cell network with equal probability; otherwise, the user accesses to the cellular network.

The parameter setting in the simulation is summarized as the following: the size of the considered geographic area is 500×500 m$^2$, i.e., L=500 m and V=500 m. The repeated stochastic game lasts for 1000 seconds and let the duration of a time slot be one second; thus, the simulation runs for 1000 episodes, i.e., T=1000. In the location model of the drone-cell networks, the initial locations of the drones are distributed in the considered area independently and uniformly, and their initial heading angles are independent and subject to a uniform distribution on $[0,2\pi)$, and parameters $(V_d, \lambda_d, \sigma_d^2)=(10, 0.1, 0.02)$. In the network capacity model, the capacity (in Mb/s) of the cellular network is subject to a truncated Gaussian distribution $N_{tru}(200, 20^2, \pm 40)$, and the capacity (in Mb/s) of each drone-cell network is independent and subject to a truncated Gaussian distribution $N_{tru}(30, 3^2, \pm 6)$. Furthermore, the coverage radius of a drone-cell $R_d$=100 m.

In the location model of the users, the initial locations of the users are distributed in the considered area independently and uniformly, and the initial velocities of the users are independent and subject to 2-D Gaussian distribution $N(0, 0; 2^2, 2^2, 0)$, where parameters $\alpha_u$=(0.73,0.73) and $\sigma_u$=(2,2). In the transmission rate model of the users, a parameter $\rho_R$=0.2 and the process $\mu_R(t)$ (in Mb/s) takes a value from the set $\{\mu_1, \mu_2, \ldots, \mu_5\}=\{2.5, 5, 7.5, 10, 12.5\}$. Besides, the one-step transition probability matrix P of $\mu_R(t)$ is shown in Table 1:

TABLE 1

One-step transition probability matrix P of $\mu_R$ (t)

| 0.8 | 0.2 | 0   | 0   | 0   |
|-----|-----|-----|-----|-----|
| 0.2 | 0.6 | 0.2 | 0   | 0   |
| 0   | 0.2 | 0.6 | 0.2 | 0   |
| 0   | 0   | 0.2 | 0.6 | 0.2 |
| 0   | 0   | 0   | 0.8 | 2   |

For the function $f(x)$ in Definition 1, this embodiment sets the network busyness ratio threshold $x_b$=0.9. For the MTAU constraints, this embodiment sets $S_u=\{1, \ldots, 10\}$ and sets $u_i^c$=6 for all $i \in S_u$. For the network selection method provided by the present disclosure, set $u_i^{max}$=20 for all $i \in \mathcal{I}$, $K_R$=5, and the penalty coefficient V=100.

Meanwhile, this embodiment leverages the following four indexes for performance evaluation of the following proposed method, including:

Queue Stability: this embodiment uses the stability variables defined as $$s_Q(t) = \frac{\max_{i \in I}[Q_i(t)]^+}{t}, \; s_D(t) = \frac{\max_{i \in I, v_i \in \Omega_i^s, \beta_i \in A_i^s}[D_{i,v_i}^{(\beta_i)}(t)]^+}{t},$$

$$s_Z(t) = \frac{\max_{i \in I}|Z_i(t)|}{t}, \text{ and } s_H(t) = \frac{\max_{i \in S_u}[H_i(t)]^+}{t}$$

over time slots t=1, 2, . . . , T−1 to measure the stability of the queues of the EFNS method.

Running Time: this is the total time of executing the EFNS method for T=1000 episodes.

Total Utility: this is the total utility of all users during the entire simulation process, i.e., $\sum_{t=0}^{T-1} \sum_{i \in I} u_i(t)$.

Fairness: this embodiment uses the Jain's fairness index, defined as $$\left(\sum_{i \in I} \bar{u}_i\right)^2 \bigg/ \left(N \sum_{i \in I} \bar{u}_i^2\right),$$

to measure the fairness of the network resource allocation, where $\bar{u}_i$ represents the time average utility of a user i during the entire simulation process, i.e., $$\bar{u}_i = \frac{1}{T}\sum_{t=0}^{T-1} u_i(t).$$

In the simulation, this embodiment tests all comparison methods on one hundred randomly generated data sets. For each comparison method, this embodiment may obtain one hundred results, and the final result is their average.

Figure 6:
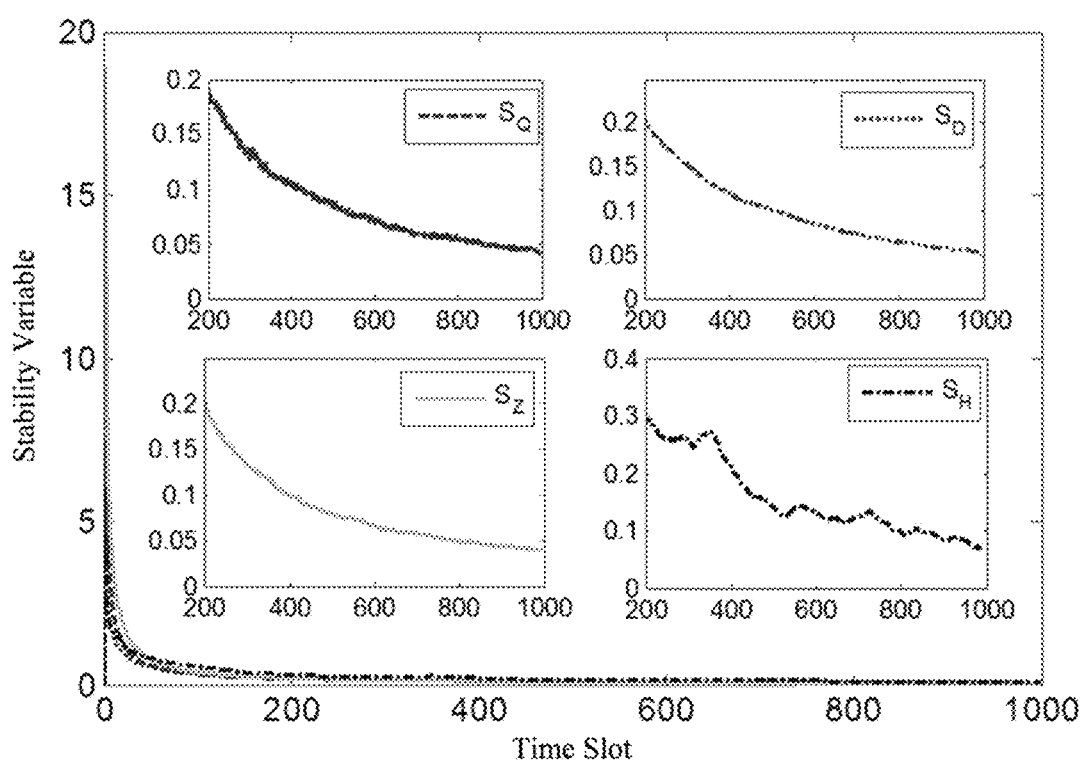
FIG. 6 is a schematic diagram illustrating the change of stability variables with time of the network selection method proposed by the present disclosure when the number of users is N=50 and the number of drones is $M_d$=6.

FIG. 6 illustrates the change of stability variables with time when the network selection method according to the present disclosure is used and when the number of users is N=50 and the number of drones is $M_d$=6. As shown in FIG. 6:

all stability variables decrease rapidly with the increase of time slot t. After a long period of time, all stability variables tend to be zero. This result indicates that the EFNS method can guarantee that all queues are mean-rate stable, and thus the constraints (21.1), (21.1), (21.1) and (21.1) are satisfied.

Figure 7:
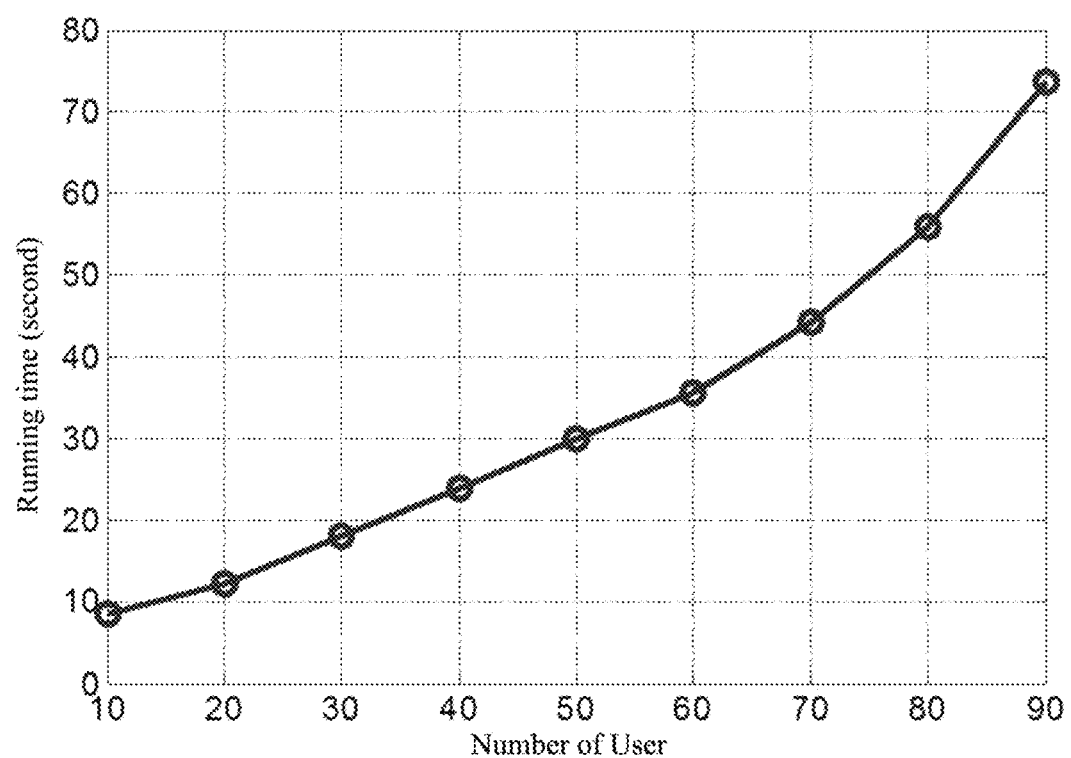
FIG. 7 is a schematic diagram illustrating the effect of the number of users N on the running time of the network selection method proposed by the present disclosure when the number of drones is $M_d$=6.
Figure 8:
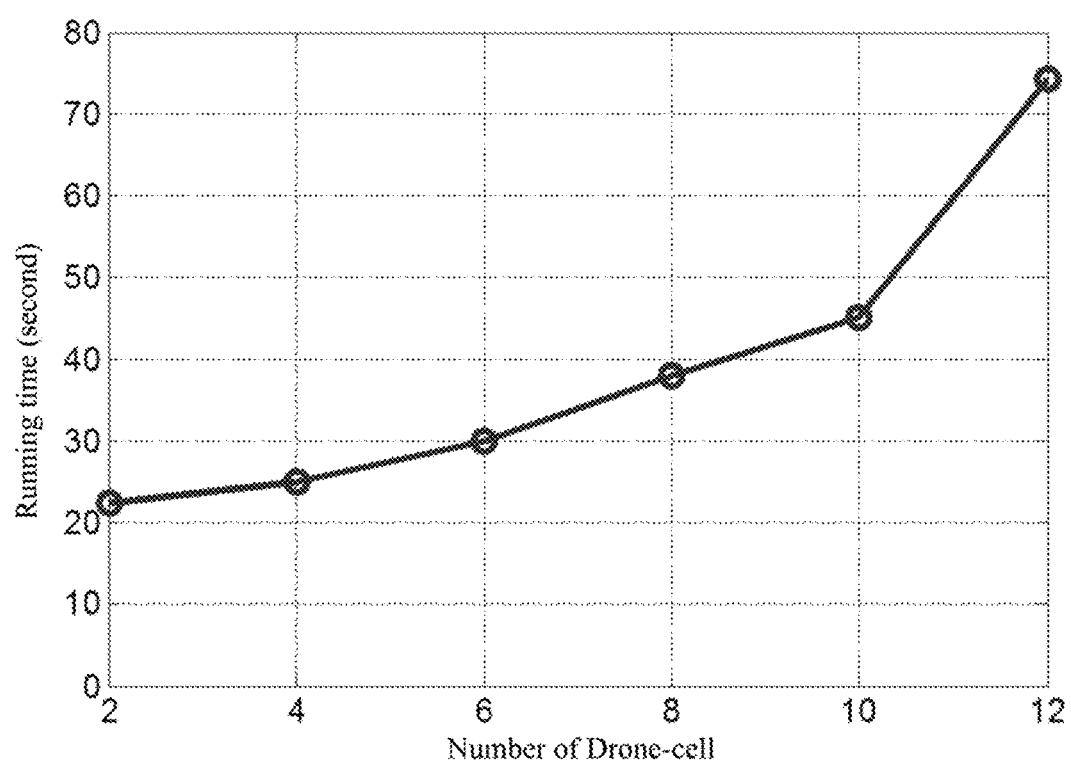
FIG. 8 is a schematic diagram illustrating the effect of the number of drones $M_d$ on the running time of the network selection method proposed by the present disclosure when the number of users is N=50.

FIG. 7 illustrates the effect of the number of users IN on the running time of the network selection method proposed by the present disclosure when the number of drones is $M_d$=6. FIG. 8 illustrates the effect of the number of drones $M_d$ on the running time of the network selection method proposed by the present disclosure when the number of users is N=50. As shown in FIG. 7 and FIG. 8:

the average running time of the EFNS method increases with the increase of N or $M_d$. This is because when N or $M_d$ increases, the scale of the problem becomes larger. Meanwhile, the EFNS method can achieve an online network selection.

Figure 9:
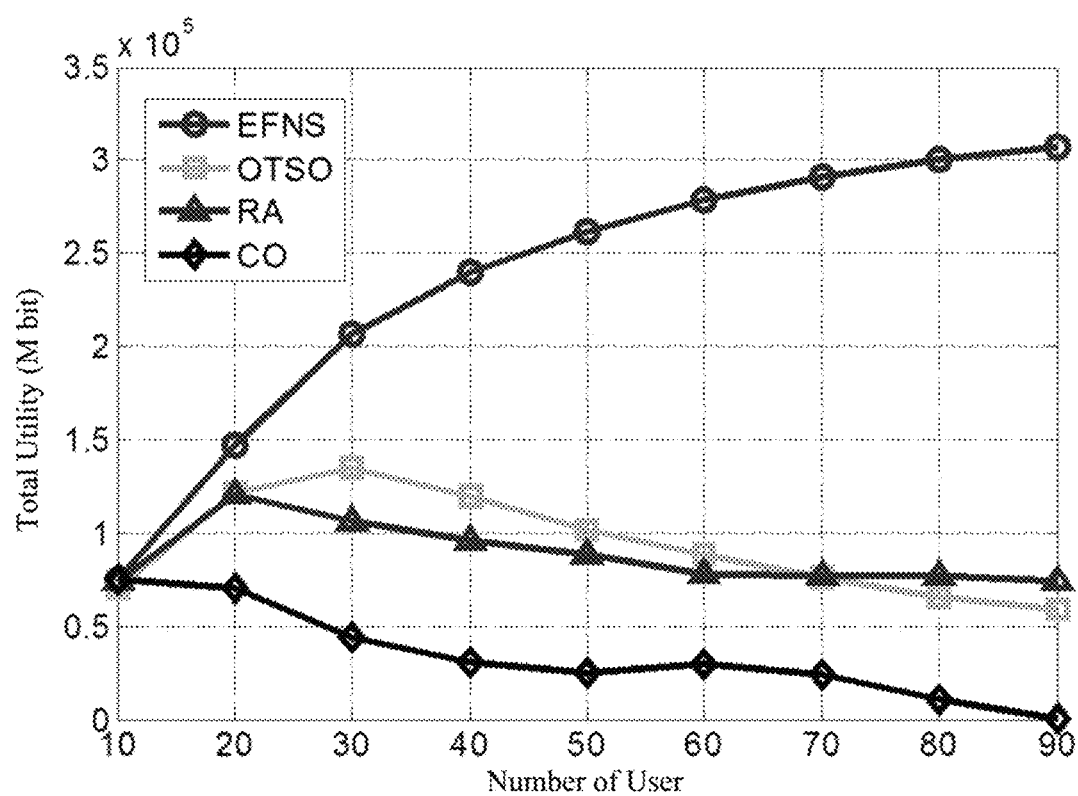
FIG. 9 is a schematic diagram illustrating the effect of the number of users N on the total user utilities obtained by the network selection method proposed by the present disclosure and the comparison methods when the number of drones is $M_d$=6.
Figure 10:
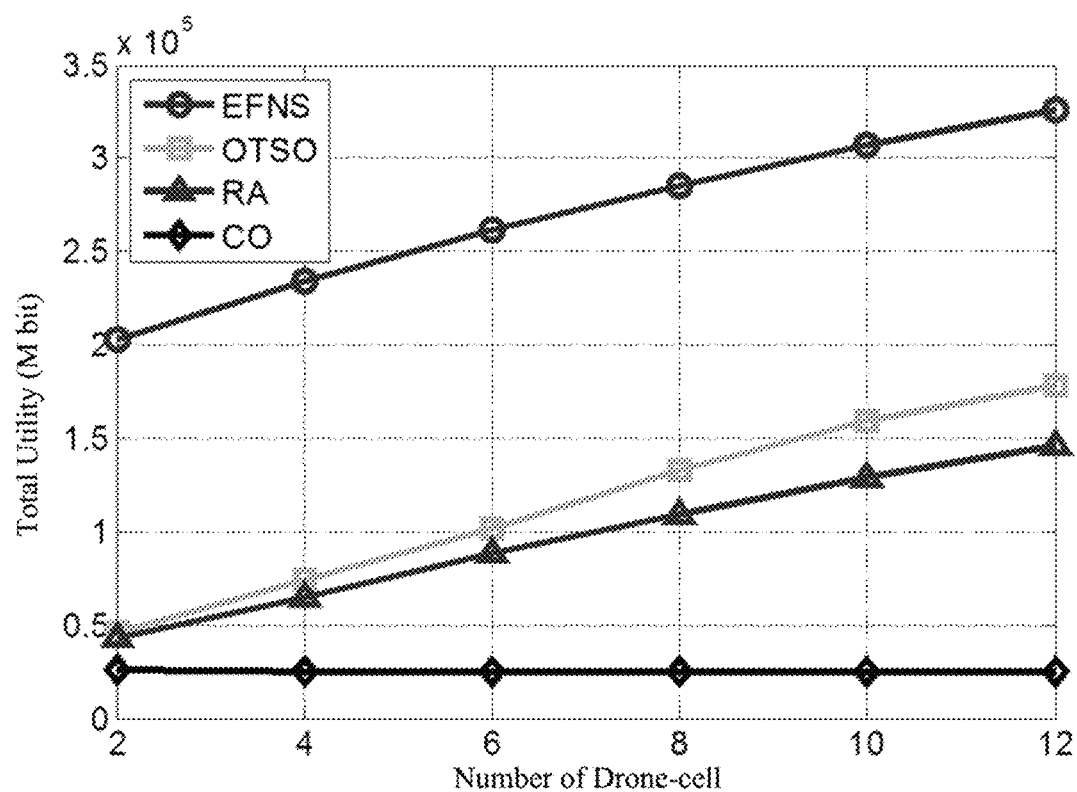
FIG. 10 is a schematic diagram illustrating the effect of the number of drones $M_d$ on the total user utilities obtained by the network selection method proposed by the present disclosure and the comparison methods when the number of users is N=50.

FIG. 9 illustrates the effect of the number of users N on the total user utilities obtained by the network selection method proposed by the present disclosure and the comparison methods when the number of drones is $M_d$=6. FIG. 10 illustrates the effect of the number of drones $M_d$ on the total user utilities obtained by the network selection method proposed by the present disclosure and the comparison methods when the number of users is N=50. As shown in FIG. 9 and FIG. 10:

the EFNS method can always achieve the highest total utility compared with the other three methods by avoiding congestion and making full use of network resources.

For the EFNS method, the total utility thereof increases with the increase of N. However, the rate of increase slows down because network capacity limit the increase of the total utility when N is large. For the other three methods, these total utilities thereof begin quickly to decrease with the increase of N. This is because these three methods do not have a mechanism to avoid network congestion and a large number of users may lead to network congestion.

For all methods except for the CO method, their total utilities increase monotonically with the increase of $M_d$, since users can offload traffic to drone-cell networks.

Figure 11:
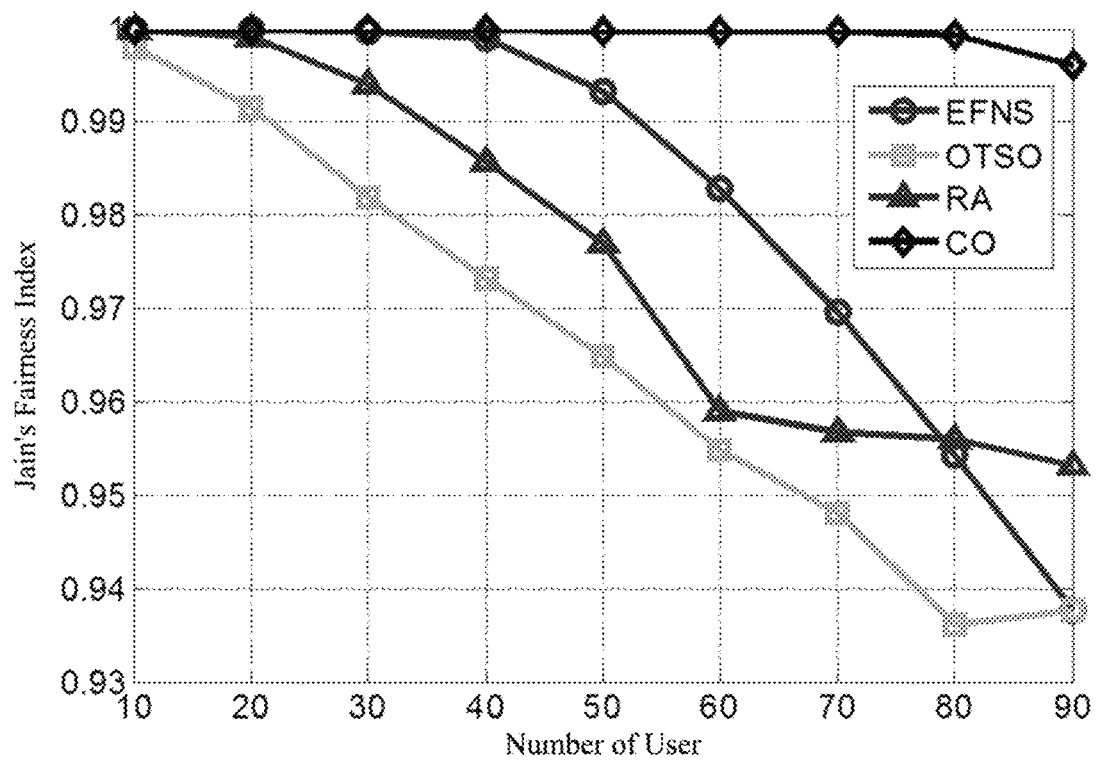
FIG. 11 is a schematic diagram illustrating the effect of the number of users N on the Jain's fairness index obtained by the network selection method proposed by the present disclosure and the comparison methods when the number of drones is $M_d$=6.
Figure 12:
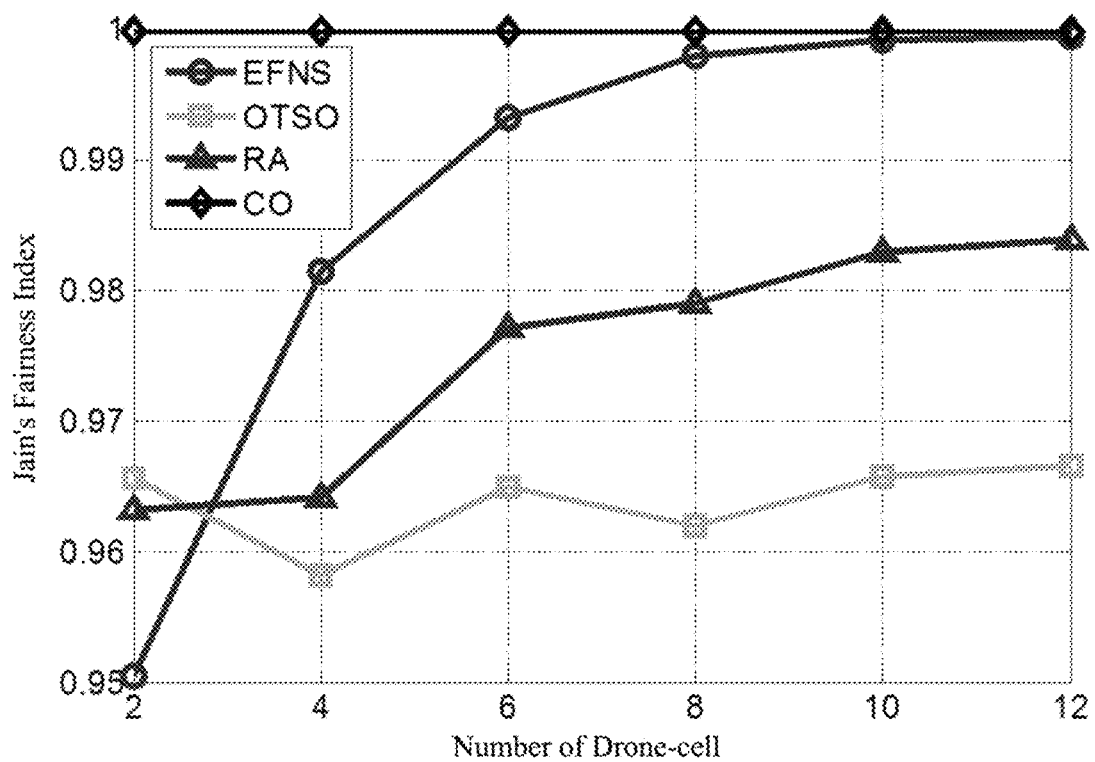
FIG. 12 is a schematic diagram illustrating the effect of the number of drones $M_d$ on the Jain's fairness index obtained by the network selection method proposed by the present disclosure and the comparison methods when the number of users is N=50.

FIG. 11 illustrates the effect of the number of users N on the Jain's fairness indices obtained by the network selection method proposed by the present disclosure and the comparison methods when the number of drones is $M_d$=6. FIG. 12 illustrates the effect of the number of drones $M_d$ on the Jain's fairness index obtained by the network selection method proposed by the present disclosure and the comparison methods when the number of users is N=50. As shown in FIG. 11 and FIG. 12:

the EFNS method can achieve a high level of fairness. Specifically, its fairness index is close to 1 because the fair allocation of network resources is considered in the proportional fairness function (12). However, the fairness index of the EFNS method decreases gradually with the increase of N or the decrease of $M_d$, that is because a great N or a small $M_d$ may activate the MTAU constraints.

Although the RA and OTSO methods do not consider fairness, they can also achieve a high level of fairness. This is because the time average utilities of users are close to each other after a long time due to the homogeneity of users in the model of this embodiment.

The CO method can achieve the highest level of fairness since users always have the same effective transmission ratio at each time slot. This CO method, however, achieves the lowest total utility.

Finally, it should be noted that each of the above embodiments is merely intended to describe, rather than limit, the technical solutions of the present disclosure. Although the present disclosure is described in detail with reference to the foregoing embodiments, persons of ordinary skill in the art should understand that it is possible to make modifications to the technical solutions described in the foregoing embodiments, or make equivalent substitutions of part or all technical features therein. However, these modifications or substitutions do not make the essence of corresponding technical solutions depart from the scope of the technical solutions in the embodiment solutions of the present disclosure.

What is claimed is:

1. A network selection method for integrated cellular and drone-cell networks, comprising:

acquiring a dynamic network model and a dynamic user model, wherein the dynamic network model comprises at least a location model of the drone-cell networks, a capacity model of the cellular network and a capacity model of the drone-cell networks, and the dynamic user model comprises at least a location model and a transmission rate model of users;

generating accessible network sets of the users according to the location model of the drone-cell networks and the location model of the users;

generating a random event vector according to the capacity model of the cellular network, the capacity model of the drone-cell networks, the accessible network sets of the users and the transmission rate model, wherein the accessible network sets of the users comprise the drone-cell networks and/or the cellular network;

generating an action vector according to the random event vector, wherein the action vector for indicating that the users choose to access to the drone-cell networks and/or the cellular network;

obtaining an individual utility of each user according to the action vector and the random event vector;

constructing a first selection model, wherein the first selection model comprises a first objective function and a first constraint, wherein the first objective function is a proportional fairness function with the time average of individual utilities of the users as independent variables, and the first constraint comprises at least a first coarse correlated equilibrium constraint, a first minimum individual time average utility constraint and a first action probability constraint, wherein the first coarse correlated equilibrium constraint is used for constraining the time average of the individual utilities and first auxiliary variables, the first minimum individual time average utility constraint is used for constraining the time average of the individual utilities, and the first action probability constraint is used for constraining the action probability under the condition of the random event vector; wherein the time average of the individual utilities is obtained according to the individual utilities, the random event probability and the action probability under the condition of the random event vector, wherein the action probability under the condition of the random event vector is the probability that the users execute the action vector under the condition that the random event vector occurs, and the random event probability is the probability that the random event vector occurs; and obtaining a value of the action probability according the first selection model, and determining networks that the users choose to access according to the value of the action probability.

2. The method according to claim 1, wherein after the obtaining an individual utility of each user according to the action vector and the random event vector, the method further comprises:

constructing a second selection model, wherein the second selection model comprises a second objective function and a second constraint, wherein the second objective function is a proportional fairness function with time average expectation of the individual utilities as independent variables, and the second constraint comprises at least second coarse correlated equilibrium constraints, a second minimum individual time average utility constraint and a second auxiliary variable constraint, wherein the second coarse correlated equilibrium constraints are used for constraining the time average expectation of the individual utilities and time average expectation of the second auxiliary variables, the second minimum individual time average utility constraint is used for constraining the time average expectation of the individual utilities, and the second auxiliary variable constraint is used for constraining the second auxiliary variables; and obtaining a value of the action vector according the second selection model, and determining networks that the users choose to access according to the value of the action vector.

3. The method according to claim 2, wherein after the obtaining an individual utility of each user according to the action vector and the random event vector, the method further comprises:

constructing a third selection model according to the second selection model, wherein the third selection model comprises a third objective function and a third constraint, wherein the third objective function is time average expectation of a proportional fair function with third auxiliary variables as independent variables, and the third constraint comprises at least the second coarse correlated equilibrium constraints, the second minimum individual time average utility constraint, the second auxiliary variable constraint, and third auxiliary variable constraints, wherein the second coarse correlated equilibrium constraints are used for constraining the time average expectation of the individual utilities and the time average expectation of the second auxiliary variables, the second minimum individual time average utility constraint is used for constraining the time average expectation of the individual utilities, the second auxiliary variable constraint is used for constraining the second auxiliary variables, and the third auxiliary variable constraints are used for constraining time average expectation of the third auxiliary variables and the time average expectation of the individual utilities;

obtaining a value of the action vector according the third selection model, and determining networks that the users choose to access according to the value of the action vector.

4. The method according to claim 3, wherein after the constructing a third selection model, the method further comprises:

constructing a fourth selection model;

obtaining a value of the action vector according the fourth selection model, and determining networks that the users choose to access according to the value of the action vector;

wherein the fourth selection model is that a difference value between a drift of total violation and an utility is less than or equal to a penalty upper bound;

the drift of the total violation is obtained according to a value of the total violation at a current time slot and a value of the total violation at a next time slot;

the value of the total violation at the current time slot is obtained according to a first virtual value at the current time slot, a second virtual value at the current time slot and a third virtual value at the current time slot;

the first virtual value in a first virtual queue at the current time slot is generated according to violation of the second coarse correlated equilibrium constraints at the previous time slot and the first virtual value in the first virtual queue at the previous time slot;

the second virtual value in a second virtual queue at the current time slot is generated according to violation of third auxiliary variable constraints at the previous time slot and the second virtual value in the second virtual queue at the previous time slot;

the third virtual value in a third virtual queue at the current time slot is generated according to the violation of a second minimum individual time average utility constraint at the previous time slot and the third virtual value in the third virtual queue at the previous time slot, wherein the first virtual value at initial time slot, the second virtual value at the initial time slot, and the third virtual value at the initial time slot are all zero;

the utility comprises: the proportional fair function and a penalty coefficient, with the third auxiliary variables as independent variables; and the penalty upper bound comprises: a constant term, a first penalty upper bound term, a second penalty upper bound term and a third penalty upper bound term, wherein the first penalty upper bound term comprises the third auxiliary variables and the second virtual value, the second penalty upper bound term comprises the second auxiliary variables and the first virtual value, and the third penalty upper bound comprises the individual utilities, the first virtual value, the second virtual value and the third virtual value.

5. The method according to claim 4, wherein the obtaining a value of the action vector according the fourth selection model, and determining networks that the users choose to access according to the value of the action vector, specifically comprises:

obtaining the first virtual value at the current time slot, the second virtual value at the current time slot, the third virtual value at the current time slot and the random event vector at the current time slot;

obtaining values of the third auxiliary variables according to the second virtual value at the current time slot and the first penalty upper bound term;

obtaining values of the second auxiliary variables according to the random event vector at the current time slot, the first virtual value at the current time slot and the second penalty upper bound term;

obtaining the value of the action vector according to the random event vector at the current time slot, the first virtual value at the current time slot, the second virtual value at the current time slot, the third virtual value at the current time slot and the third penalty upper bound term, and determining the networks that the users choose to access according to the value of the action vector;

the obtaining the value of the action vector according to the random event vector at the current time slot, the first virtual value at the current time slot, the second virtual value at the current time slot, the third virtual value at the current time slot and the third penalty upper bound term, specifically comprises:

constructing a suggestion matrix constraint and a first action vector constraint, wherein a suggestion matrix represents that the users are suggested to access to the drone-cell networks and/or the cellular network, and the suggestion matrix constraint is used for constraining the suggestion matrix;

using a mapping table between the individual utilities and transmission rate and a mapping relationship between the suggestion matrix and the action vector to process the third penalty upper bound term, to generate a fourth penalty upper bound term;

using the mapping relationship between the suggestion matrix and the action vector to process the first action vector constraint, to obtain a second action vector constraint; and obtaining a value of the suggestion matrix according the fourth penalty upper bound term, the suggestion matrix constraint and the second action vector constraint, and determining the networks that the users choose to access according to the value of the suggestion matrix.

6. The method according to claim 1, wherein the first objective function specifically comprises: $f_1 = \phi(\overline{u}_1, \ldots, u_i, \ldots, u_N)$, wherein, $f_1$ represents the first objective function, $\overline{u}_1$, represents the time average of the individual utility of the i-th user, and $\phi(\overline{u}_1, \ldots, u_i, \ldots, u_N)$ represents a proportional fair function;

the first coarse correlated equilibrium constraint specifically comprises:

$$\sum_{\omega \in \Omega} \sum_{\alpha \in A} \pi[\omega] Pr[\alpha|\omega] \hat{u}_i(\alpha, \omega) \geq \sum_{\omega \in \Omega} \sum_{\alpha \in A} \pi[\omega] Pr[\alpha|\omega] \varphi_i(\omega_i),$$

$$\forall i \in \mathcal{I} \sum_{\omega \in \Omega|\omega_i = v_i} \sum_{\alpha \in A} \pi[\omega] Pr[\alpha|\omega] \varphi_i(v_1) \geq$$

$$\sum_{\omega \in \Omega|\omega_i = v_i} \sum_{\alpha \in A} \pi[\omega] Pr[\alpha|\omega] \hat{u}_i((\beta_i, \alpha_{\bar{i}}), \omega); \forall i \in \mathcal{I}, v_i \in \Omega_i^s, \beta_i \in A_i^s$$

wherein, $\omega$ represents the random event vector, $\alpha$ represents the action vector, $\pi[\omega]$ represents a probability of the random event vector, $Pr[\alpha|\omega]$ represents an action probability under the condition of the random event vector, $\hat{u}_i(\alpha,\omega)$ represents the individual utility of the i-th user, both $\varphi_i(\omega_i)$ and $\varphi_i(v_i)$ represent the first auxiliary variable, $\alpha_{\bar{i}} = \alpha \backslash \{\alpha_i\}$, $\alpha_i$ represents that the i-th user chooses to access to the network $j=\alpha_i$, $\omega_i$, represents the i-th element in the random event vector, $v_i$ represents a preset event of the i-th user, $\beta_i$ represents a preset action of the i-th user, A represents an available set of the action vector, $\Omega$ represents an available set of the random event vector, $A_i^s$ represents a simplified available set of the preset action of the i-th user, and $\Omega_i^s$ represents a simplified available set of the preset event of the i-th user;

the first minimum individual time average utility constraint comprises: $\overline{u}_i \geq u_i^c$, $\forall i \in S_u$, wherein, $u_i^c$ represents a first minimum individual time average utility, and $S_u$ represents a set of the users with minimum individual time average utility requirements; and the first action probability constraint specifically comprises:

$$Pr[\alpha|\omega] \geq 0, \forall \alpha \in A, \omega \in \Omega$$

$$Pr[\alpha|\omega] = 0, \forall \alpha \notin A, (\omega), \omega \in \Omega;$$

$$\sum_{\alpha \in A} Pr[\alpha|\omega] = 1, \forall \omega \in \Omega$$

wherein, $A(\omega)$ represents the available set of the action vector under the random event vector $\omega$.

7. The method according to claim 3, wherein the second objective function specifically comprises:

$$f_2 = \liminf_{t \to \infty} \phi(\overline{u}_1(t), \ldots, \overline{u}_i(t), \ldots, \overline{u}_N(t)),$$

wherein, $\overline{u}_i(t)$ represents the time average expectation of the individual utility of the i-th user;

the second coarse correlated equilibrium constraints specifically comprise:

$$\liminf_{t \to \infty} \left[ \overline{u}_i(t) - \sum_{v_i \in \Omega_i^s} \overline{\varphi}_{i,v_i}(t) \right] \geq 0, \forall i \in \mathcal{I}$$

$$\liminf_{t \to \infty} \left[ \overline{\varphi}_{i,v_i}(t) - \overline{u}_{i,v_i}^{(\beta_i)}(t) \right] \geq 0, \forall i \in \mathcal{I}, v_i \in \Omega_i^s, \beta_i \in A_i^s$$

wherein, $\overline{\varphi}_{i,v_i}(t)$ represents the time average expectation of the second auxiliary variables, and $u_{i,v_i}^{(\beta_i)}(t) \square \hat{u}_i((\beta_i, \alpha_{\bar{i}}(t)), \omega(t)) 1\{\omega_i(t) = v_i\}$, and $1\{\bullet\}$ represents an indicator function;

the second minimum individual time average utility constraint specifically comprises:

$$\liminf_{t \to \infty} [\overline{\varphi}_i(t) - u_i^c] \geq 0, \forall i \in S_u;$$

the second auxiliary variable constraint specifically comprises:

$$0 \leq \varphi_{i,v_i}(t) \leq u_i^{max} 1\{\omega_i(t) = v_i\}$$

$$\forall t \in \{0,1,2,\ldots\}, i \in \mathcal{I}, v_i \in \Omega_i^s;$$

the third objective function specifically comprises:

$$f_3 = \liminf_{t \to \infty} \overline{g}(t),$$

wherein, $g(t) = \phi(\gamma_1(t), \ldots, \gamma_N(t))$, $0 \leq \gamma_i(t) \leq u_i^{max}$, and $u_i^{max}$ represents an upper bound of data transmission rate required by the i-th user;

the second coarse correlated equilibrium constraints specifically comprise:

$$\liminf_{t \to \infty}\left[\bar{u}_i(t) - \sum_{v_i \in \Omega_i^s} \bar{\varphi}_{i,v_i}(t)\right] \geq 0, \forall\, i \in \mathcal{I}$$

$$\liminf_{t \to \infty}\left[\bar{\varphi}_{i,v_i}(t) - \bar{u}_{i,v_i}^{(\beta_i)}(t)\right] \geq 0, \forall\, i \in \mathcal{I}, v_i \in \Omega_i^s, \beta_i \in A_i^s$$

the second minimum individual time average utility constraint specifically comprises:

$$\liminf_{t \to \infty}[\bar{u}_i(t) - u_i^c] \geq 0, \forall\, i \in \mathcal{S}_u;$$

the second auxiliary variable constraint specifically comprises:

$$0 \leq \varphi_{i,v_i}(t) \leq u_i^{max} 1\{\omega_i(t) = v_i\}$$

$$\forall t \in \{0,1,2,\ldots\}, i \in \mathcal{I}, v_i \in \Omega_i^s;$$

the third auxiliary variable constraints specifically comprise:

$$\lim_{t \to \infty}\left|\bar{\gamma}_i(t) - \bar{u}_i(t)\right| = 0, \forall\, i \in \mathcal{I}$$

$$0 \leq \gamma_i(t) \leq u_i^{max}, \forall\, t \in \{0, 1, 2, \ldots\}, i \in \mathcal{I}$$

wherein, $\bar{\gamma}_i(t)$ represents the time average expectation of the third auxiliary variables.

8. The method according to claim 4, wherein
the fourth selection model specifically comprises:

$$\Delta(t) - Vg(t) \leq B + \sum_{i \in \mathcal{I}}[H_i(t)]^+ u_i^c - V\phi(\gamma_1(t),\ldots,\gamma_N(t)) +$$

$$\sum_{i \in \mathcal{I}} Z_i(t)\gamma_i(t) + \sum_{i \in \mathcal{I}}\left\{[Q_i(t)]^+ \sum_{v_i \in \Omega_i^s} \varphi_{i,v_i}(t)\right\} -$$

$$\sum_{i \in \mathcal{I}}\sum_{v_i \in \Omega_i^s, \beta_i \in A_i^s}[D_{i,v_i}^{(\beta_i)}(t)]^+ \varphi_{i,v_i}(t); + \sum_{i \in \mathcal{I}}\sum_{v_i \in \Omega_i^s, \beta_i \in A_i^s}[D_{i,v_i}^{(\beta_i)}(t)]^+ u_{i,v_i}^{(\beta_i)}(t) -$$

$$\sum_{i \in \mathcal{I}}\{[Q_i(t)]^+ + Z_i(t) + [H_i(t)]^+\}u_i(t)$$

wherein, $$L(t) \triangleq \frac{1}{2}\sum_{i \in \mathcal{I}}([Q_i(t)]^+)^2 +$$

$$\frac{1}{2}\sum_{i \in \mathcal{I}}\sum_{v_i \in \Omega_i^s, \beta_i \in A_i^s}([D_{i,v_i}^{(\beta_i)}(t)]^+)^2 + \frac{1}{2}\sum_{i \in \mathcal{I}} Z_i(t)^2 + \frac{1}{2}\sum_{i \in \mathcal{I}}([H_i(t)]^+)^2,$$

$\Delta(t) = L(t+1) - L(t)$, $[x]^+ = \max\{x, 0\}$, $Q_i(t)$ represents a value of the first term of the first virtual value at time slot t, $$Q_i(t+1) = Q_i(t) + \sum_{v_i \in \Omega_i^s} \varphi_{i,v_i}(t) - u_i(t), D_{i,v_i}^{(\beta_i)}(t)$$

represents a value of the second term of the first virtual value at time slot t, $D_{i,v_i}^{(\beta_i)}(t+1) = D_{i,v_i}^{(\beta_i)}(t) + u_{i,v_i}^{(\beta_i)}(t) - \varphi_{i,v_i}(t)$, $\varphi_{i,v_i}(t)$ represents a value of the second auxiliary variable at time slot t, $Z_i(t)$ represents a value of the second virtual value at time slot t, $Z_i(t+1) = Z_i(t) + \gamma_i(t) - u_i(t)$, $u_i(t)$ represents an individual utility of the i-th user at time slot t, $$B \square \sum_{i \in \mathcal{I}}(u_i^{max})^2 + \frac{1}{2}\sum_{i \in \mathcal{S}_u}(u_i^{max})^2 + \frac{1}{2}\sum_{i \in \mathcal{I}}|A_i^s|(u_i^{max})^2,$$

$|\cdot|$ represents the number of elements in a set, $H_i(t)$ represents a value of the third virtual value at time slot t, and $H_i(t+1) = H_i(t) + u_i^c - u_i(t)$.

9. The method according to claim 5, wherein
the fourth penalty upper bound term specifically comprises:

$$\sum_{i \in \mathcal{I}}\sum_{j \in \mathcal{J}} c_{ij}a_{ij};$$

the suggestion matrix constraint specifically comprises:

$$\sum_{i \in \mathcal{I}} R_i(t)a_{ij} \leq x_b C_j(t), \forall\, j \in \mathcal{J}\backslash\{0\}$$

$$\sum_{j \in \mathcal{J}} a_{ij} = 1, \forall\, i \in \mathcal{I}$$

$$a_{ij} \in \{0, 1\}, \forall\, i \in \mathcal{I}, j \in \mathcal{J}$$

$$a_{ij} = 0, \forall\, i \in \mathcal{I}, j \notin A_i(t)$$

wherein, $$c_{ij} = \begin{cases} (E_i(t) - F_{ij}(t))R_i(t), & \forall\, j \in \mathcal{J}\backslash\{0\} \\ -F_{ij}(t)R_i(t), & j = 0 \end{cases},$$

$$E_i(t) = [Q_i(t)]^+ + Z_i(t) + [H_i(t)]^+,$$

$$F_{ij}(t) = \sum_{v_i \in \Omega_i^s, \beta_i \in A_i^s}[D_{i,v_i}^{(\beta_i)}(t)]^+ \theta_{ij}^{(\beta_i)} 1\{\omega_i(t) = v_i\},$$

$$\theta_{i,j}^{(\beta_i)} = \begin{cases} 1, & j = \beta_i \\ \theta_{i,\beta_i(t)}, & j \neq \beta_i \end{cases},$$

represents an element in the suggestion matrix, $\mathcal{J}$ represents a set of networks, j represents a serial number of a network, $\theta_{i,\beta_i}(t)$ is an effective transmission ratio of the i-th user accessing to the network $j = \beta_i$ at time slot t, $R_i(t)$ represents transmission rate of the i-th user at time slot t, $C_j(t)$ represents a capacity of the j-th network at time slot t, and $A_i(t)$ represents an available set of the action of the i-th user at time slot t.

\* \* \* \* \*